United States Patent
Tso et al.

[11] Patent Number: 6,047,327
[45] Date of Patent: *Apr. 4, 2000

[54] SYSTEM FOR DISTRIBUTING ELECTRONIC INFORMATION TO A TARGETED GROUP OF USERS

[75] Inventors: Michael Man-Hak Tso; David Alfred Romrell, both of Hillsboro; Daniel Joshua Gillespie, Aloha, all of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/602,985

[22] Filed: Feb. 16, 1996

[51] Int. Cl.$^7$ ........................................ G06F 17/30
[52] U.S. Cl. .................. 709/232; 709/202; 709/203; 709/217; 709/219; 709/226; 709/229
[58] Field of Search ..................... 395/200.1, 200.01, 395/200.06, 200.07, 200.08, 200.09, 680, 682, 200.32, 200.33, 200.56, 200.59; 709/202, 203, 217, 219, 226, 229, 232

[56] References Cited

U.S. PATENT DOCUMENTS

| | | |
|---|---|---|
| 5,325,527 | 6/1994 | Cwikowski et al. .................... 395/200 |
| 5,347,632 | 9/1994 | Filepp et al. .............................. 395/200 |
| 5,410,543 | 4/1995 | Seitz et al. ............................. 370/85.13 |
| 5,442,771 | 8/1995 | Filepp et al. .............................. 395/650 |
| 5,557,721 | 9/1996 | Fite et al. ................................. 395/148 |
| 5,568,612 | 10/1996 | Barret et al. ....................... 395/200.01 |
| 5,572,643 | 11/1996 | Judson .................................... 395/793 |
| 5,611,050 | 3/1997 | Theimer et al. . |
| 5,623,660 | 4/1997 | Josephson .............................. 395/609 |
| 5,721,908 | 2/1998 | Lagarde et al. ........................ 395/610 |
| 5,737,619 | 4/1998 | Judson .................................... 395/761 |
| 5,745,754 | 4/1998 | Lagarde et al. ........................ 395/615 |
| 5,752,246 | 5/1998 | Rogers et al. ........................... 707/10 |
| 5,754,939 | 5/1998 | Herz et al. .............................. 455/4.2 |
| 5,761,662 | 6/1998 | Dasan et al. ............................. 707/10 |

Primary Examiner—Zarni Maung
Assistant Examiner—Saleh Najjar
Attorney, Agent, or Firm—Blakely, Sokoloff, Taylor & Zafman LLP

[57] ABSTRACT

A communications system having a first server and a first client connected to the first server through a first network, wherein the first server selectively sends a set of InfoBites to the first client based on a filter. A method for distributing information for the above communications system, including the steps of deriving a set of InfoBites, filtering the set of InfoBites based on the filter into a filtered set of InfoBites, and, transmitting the filtered set of InfoBites to the first client.

26 Claims, 9 Drawing Sheets

SYSTEM FOR DISTRIBUTING ELECTRONIC INFORMATION TO A TARGETED GROUP OF USERS

BACKGROUND OF THE INVENTION

1. Field of the Invention

The present invention relates to the field of use of information distribution systems. More particularly, the present invention relates to the automatic distribution of information to different users based on a set of selected criteria.

2. Description of Related Art

Currently, users who wish to obtain information through electronic sources must search for a source that will provide the information and then arrange for a transfer of that information, such as a download of the information.

Systems like the World Wide Web (WWW) and on-line service providers, such as CompuServe® and America Online®, provide searching and indexing engines that can make searching and finding relevant information much easier, allowing the user to search for information based on a list of key words that the user provides to the search engine. However, these systems still require the user to initiate the search, and then sift through the "hits", or found results, to locate any actually relevant information. Also, the user must still know what the user is looking for and make an effort to look for that information.

Electronic news clipping services also exist to clip articles for users based on a pre-determined set of user defined criteria. However, a user's pre-determined criteria normally has to be manually changed by the user. Also, the user is not provided with options to perform further actions based on the articles.

Advertisers and marketers who currently advertise on electronic services also have limited access to users and often can not focus their advertisements due to a lack of information for each user, including positional and demographic information.

Thus, it would be desirable to have an electronic information distribution system which would bypass the limitations stated above.

SUMMARY

Instead of relying on the efforts of a user to find and retrieve information, the present invention allows an InfoCast server to send information or a pointer to the information such as a uniform resource locator (URL) directly to the user. What information is sent to the user is dependent on various factors, including: the location of the user; the time of day; and the information contained in a user profile. The user profile indicates the areas of interest of the user and can be dynamically adjusted based on user feedback.

The system, according to the present invention, has the advantage of allowing information and content providers to take an active role in the distribution of information. Another advantage of the system is that it allows information providers to target particular audiences for receiving information and advertisement. This ability to "focus" the dissemination of information allows information providers and marketers to only send information to users who might be interested in that information, reducing excessive waste of bandwidth and transmission capability. Specifically, the system allows the division of a general audience into different segments of targeted audiences at a fine level of granularity based on the criteria used.

In addition, the InfoCast servers support mobility of the users of the system as the system maintains real-time location information for each user. Also, the system supports the transfer of information over the nodes of many types of communication networks such as cellular data networks, local area networks, and wide area networks. Thus, a user can connect to and communicate with the system through a wide variety of methods.

Other objects, features and advantages of the present invention will be apparent from the accompanying drawings, and from the detailed description that follows below.

DETAILED DESCRIPTION OF THE INVENTION

The invention provides a method and apparatus for automatically distributing electronic information to a targeted group of users. For purposes of explanation, specific embodiments are set forth to provide a thorough understanding of the present invention. However, it will be understood by one skilled in the art, from reading this disclosure, that the invention may be practiced without these details. Further, although the present invention is described through the use of a wide area network, a local area network, and a cellular telephone network, most, if not all, aspects of the invention apply to networks in general. Moreover, well-known elements, devices, process steps and the like are not set forth in detail in order to avoid obscuring the present invention.

Figure 1:
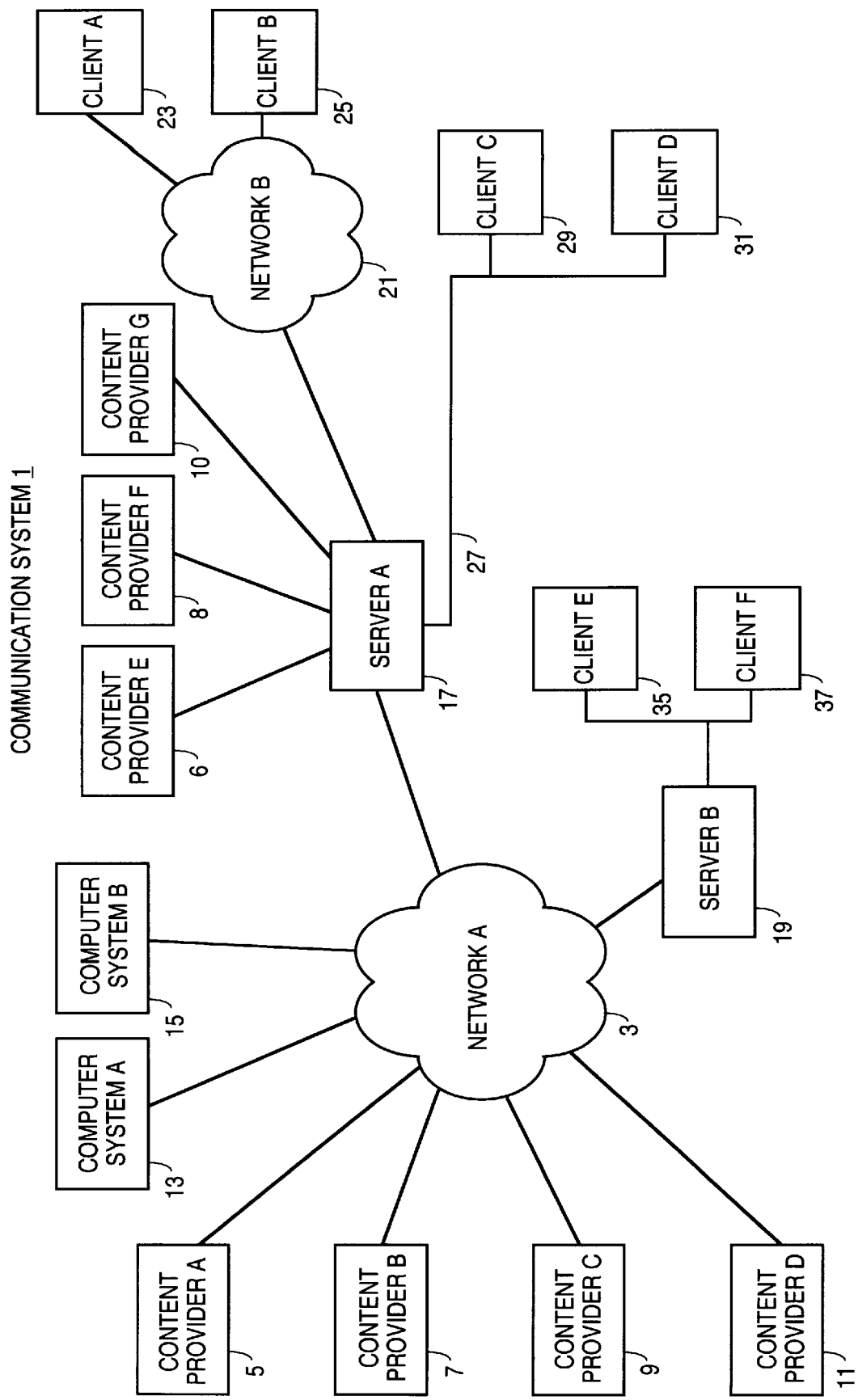
FIG. 1 illustrates a communication system configured in accordance with the preferred embodiment of the invention.

In FIG. 1, a communication system 1 containing the preferred embodiment of the invention is illustrated. Communication system 1 includes a network A 3, which in the preferred embodiment is a wide area network such as the internet. Network A 3 has a content provider A 5, a content provider B 7, a content provider C 9, and a content provide D 11 connected to it. Network A 3 also has a computer system A 13 and a computer system B 15 connected to it. Lastly, network A 3 has a server A 17 and a server B 19 connected to it.

Server A 17, which is termed an InfoCast server, is connected to a network B 21, which, in the preferred embodiment, is a cellular communication system. In addition, server A 17 is also connected to a content provider E 6, a content provider F 8, and a content provider G 10, as described below. Server A 17 is also connected to a client A 23 and a client B 25 through the use of network B 21. In addition, server A 17 is connected to a client C 29 and a client D 31 through a local area network 27. Similarly, server B 19, which is also an InfoCast server, is connected to a client E 35 and a client F 37 through a local area network 33.

In the preferred embodiment, content provider A 5 is a hyper-text transport protocol (HTTP) server that can provide a real-time news service to the various computer systems connected to network A 3 via hyper-text markup language (HTML) documents. Content provider B 7 is a file transfer protocol (FTP) server which allows clients to access files located on the server. Content provider C 9 is another HTTP server maintained by a business and configured to be able to process electronic transactions. Content provider D 11 is an HTTP server configured to provide advertising information via HTML documents.

Alternatively, content providers A 5, B 7, C 9 and D 11 can be servers offering other types of information using different protocols. For instance, content provider A 5, instead of being an HTTP server configured for delivering news, can be a server for providing wide area information services (WAIS). Other types of servers that can be located on network A 3 in addition to the servers mentioned above can include Gopher servers, Archie servers, and other servers providing other multimedia data. Moreover, servers providing WWW "searching" services—i.e., servers that search WWW sites and retrieve information matching certain criteria from those WWW sites—and USENET search engines—i.e., servers that search USENET news groups—can also interface with an InfoCast server to provide a constant stream of new information.

Computer system A 13 and computer system B 15 represent a general class of computer systems including workstations, minicomputers and personal computers. These computer systems can access the various services provided by content provider A 5, B 7, C 9 and D 11. Alternatively, computer system A 13 and computer system B 15 can be any computing device equipped to access network A 3.

Content provider E 6 is a computer system that is connected to server A 17 through the use of a public switched telephone network. Content provider F 8 is a service providing a video/audio feed to server A 17 through the use of a satellite communications network. Content provider G 10 is a video/audio feed service that is directly connected to server A 17 through the use of a coaxial cable.

Figure 2:
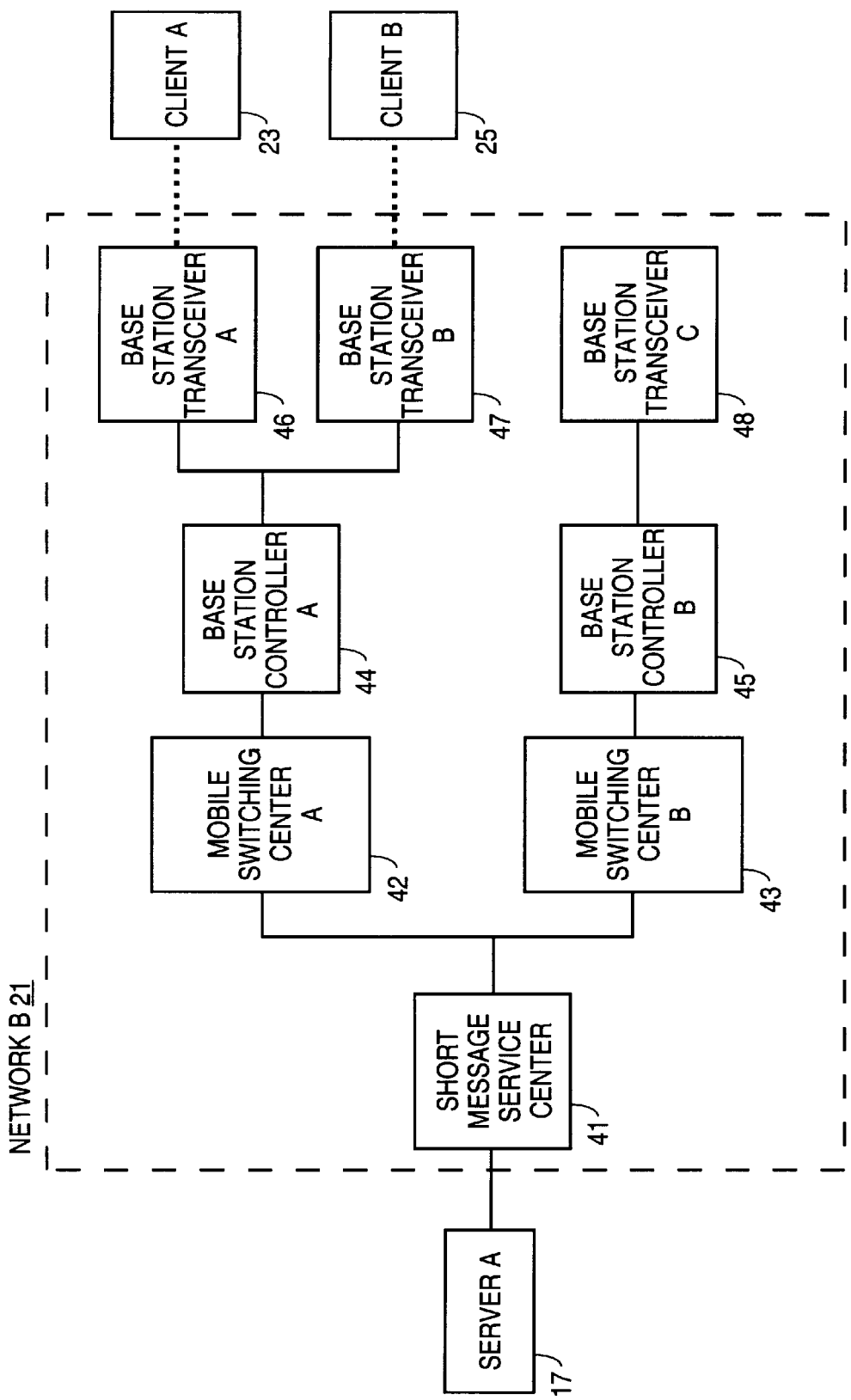
FIG. 2 illustrates a cellular network configured in accordance with the preferred embodiment of the invention.

FIG. 2 illustrates the preferred embodiment of network B 21, which represents a cellular telephone network such as that defined by the Global System for Mobile (GSM) communications standards. In network B 21, a short message service (SMS) center 41 is connected to a mobile switching center A 42 and a mobile switching center B 43. Mobile switching center A 42 and mobile switching center B 43 are connected to a base station controller A 44 and a base station controller B 45, respectively. Base station controller A 44 is interfaced to a base station transceiver A 46 and a base station transceiver B 47 while base station controller B 45 interfaces with a base station transceiver C 48. It is to be noted that each short message service center can serve one or more mobile switching centers, which in turn can support one or more base station controllers. Moreover, each base station controller is interfaced to one or more base station transceivers. The GSM system provides cell-level location information of all devices in the system and also allows the sending of SMS broadcasts messages to all devices. The GSM elements in network B 21 and their functions are well known in the art and a description is provided herein for completeness only.

In network B 21, mobile switching center A 42 and mobile switching center B 43 control the establishment of calls between different cellular devices, the roaming of portable cellular devices, and the handing-off of devices between different base stations. For roaming purposes, mobile switching center A 42 and mobile switching center B 43 also track the real-time physical location of each cellular device, and a user of each cellular device, through the use of base station controller A 44, base station controller B 45, base station transceiver A 46, base station transceiver B 47, and base station transceiver C 48.

For example, in FIG. 2, client A 23, which is located in a geographical area served by base station transceiver A 46, communicates with server A 17 through the use of base station transceiver A 46, base station controller A 44, mobile switching center A 42, and short message service center 41. Client B 25 is similarly connected to server A 17, except client B 25 uses base station transceiver B 47 since client B 25 is located in a geographical location served by base station transceiver B 47. Each base station transceiver serves all clients operating in its geographical location. Thus, if client A 23 moves into the geographical area served by base station transceiver B 47, then base station transceiver B 47 would become responsible for serving client A 23 in addition to serving client B 25. Each InfoCast server of the preferred embodiment can service one or more domains, wherein each domain is composed of a set of distinct base station transceivers, which are preferably located closely to each other.

Figure 3:
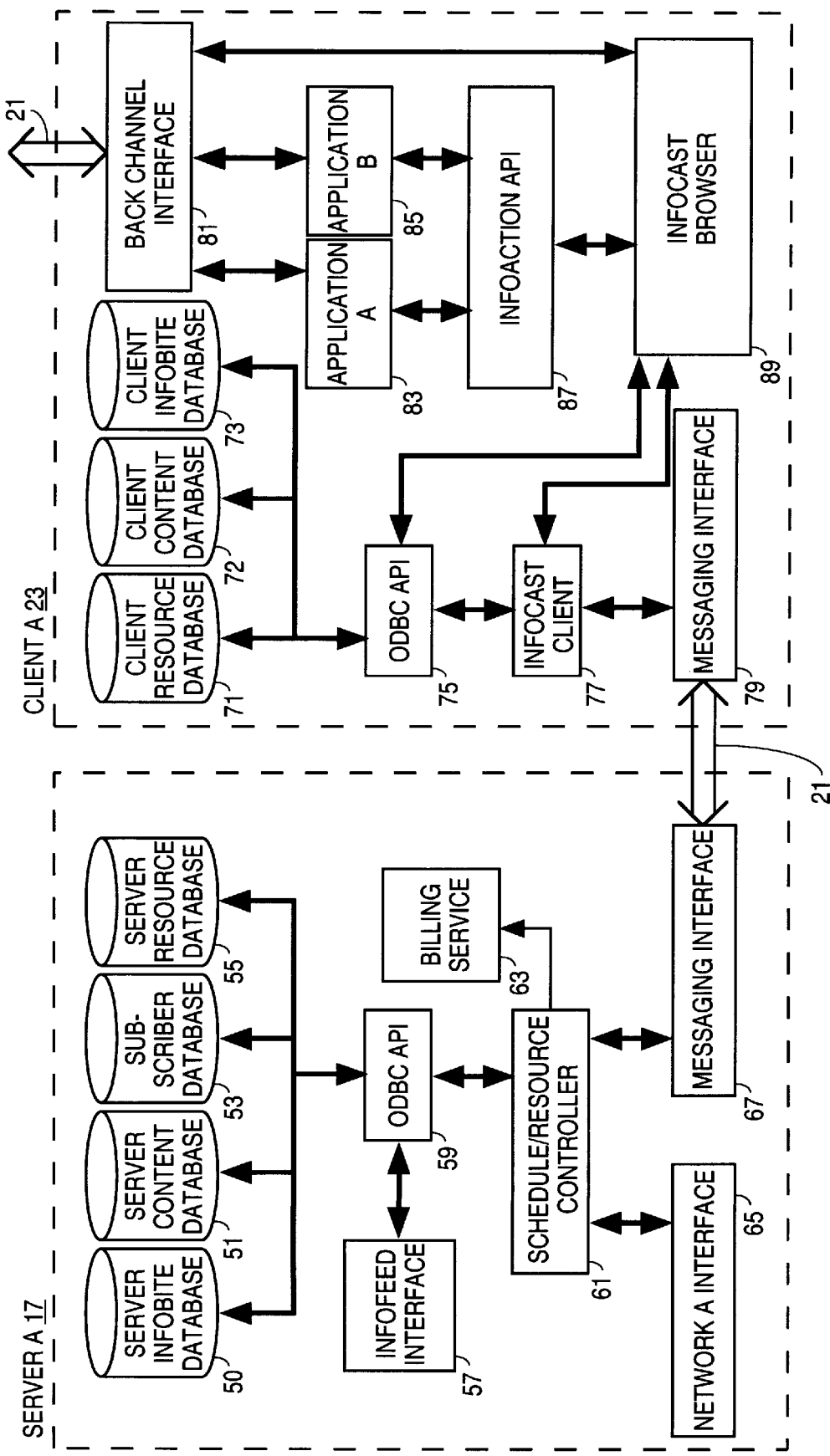
FIG. 3 illustrates a server and a client located on the communication system and configured in accordance with the preferred embodiment of the invention.

In the preferred embodiment, server A 17 contains positional information of all users located in the domains served by server A 17. Server A 17 also contains additional information for each user, including such information as gender, income, interests, employment, and other demographic information. The records containing each user's information is stored on a subscriber database at the user's home InfoCast server, as described below. Alternatively, user information may also be stored or replicated at other locations on the connected network, also as described below. In FIG. 3, server A 17 contains a server InfoBite database 50, a server content database 51, a subscriber database 53, and a server resource database 55 coupled to an open database connectivity (ODBC) application programming interface (API) 59. ODBC API 59 is also coupled to an InfoFeed interface 57 and a schedule/resource controller 61. Schedule/resource controller 61 is coupled to a billing service 63, a network A interface 65, and a messaging interface 67 for communicating with a client A 23 through the use of network B 21.

Client A 23 contains a client resource database 71, a client content database 72 and a client InfoBite database 73 coupled to an ODBC API 75. ODBC API 75 is also coupled to an InfoCast client 77 and an InfoCast browser 89. InfoCast browser 89 is coupled to a back channel interface 81 and an InfoAction API 87. InfoAction API 87 is coupled to an application A 83 and an application B 85, both of which are also coupled to back channel interface 81. InfoCast client 77 is coupled to messaging interface 79 for allowing client A 23 to communicate with server A 17 through the use of network B 21.

Subscriber database 53 contains the records of all users for which server A 17 is the home InfoCast server, and all users who are currently in the territory serviced by server A 17. Therefore, the subscriber database of each InfoCast server contains a subset of a logical database containing all the records of the users—i.e., the complete subscriber database is actually physically distributed over all the InfoCast servers. For example, assuming there is only one InfoCast server in each of the fifty states of the United States, the subscriber database in the InfoCast server located in California would contain the user records of all users who have the California InfoCast server as their home InfoCast server. In addition, the subscriber database contained in the California InfoCast server would also contain the user records of all the users who are currently in California.

When a user who has an InfoCast server of another state as the user's home InfoCast server leaves the territory served by the home InfoCast server—i.e., when the user leaves the home state of the user—the InfoCast server of the state to which the user has traveled will request a copy of the user's record from the user's home InfoCast server. For example, when a user who has the California InfoCast server as the user's home InfoCast server travels to New York, which is served by the New York InfoCast server, the New York InfoCast server will request a copy of the user's record from the California InfoCast server. Until the user leaves New York, the New York InfoCast server is responsible for maintaining and updating the user's record both in its own subscriber database and the home, or California, InfoCast server's subscriber database. When the user either returns to California or travels to another state, control is transferred to the California InfoCast server or the InfoCast server serving the other state, respectively.

Server content database 51 contains data used by the InfoCast server in serving the users currently in its territory. Server content database 51 contains data received from sources such as content provider A 5, content provider B 7, content provider C 9, content provider D 11, content provider E 6, content provider F 8, and content provider G 10. Thus, server content database 51 would contain news and weather information from content provider A 5 and advertisements from content provider D 11. In addition, server content database 51 can contain such resources as the geographical location of all airports, train stations, and other transportation centers, in addition to other points of interest for which a user might wish to receive information. Server content database 51 is also used to contain content from other sources such as computer system A 13, computer system B 15, or even from the content database of server B 19, which has the same structure as server A 17. Moreover, server content database 51 is preferably used to contain resources that are often used to reduce accessing time but yet of a relatively small size to conserve space. Larger resources will not be contained in server content database 51 and will be accessed through the use of server resource database 55, as described below.

An example of the use of server content database 51 can be seen where server A 17 is located in California. In that case, server content database 51 would contain the maps of the state of California at various levels of detail—e.g., a state level map, numerous county level maps, and numerous street level maps. It is to be noted that server content database 51 is not limited to containing data which is considered local to the InfoCast server, but can also contain data which might be contained on other InfoCast servers. Thus, server content database 51 can contain a map of the United States, a map of North America, and even a world map. In addition, the data contained in server content database 51 is not limited to geographical data. For example, server content database 51 can contain data about restaurants, hotels, entertainment activities, and tourist attractions. Server content database 51, along with other databases in the invention, are accessed through ODBC API 59 as described below.

Server resource database 55 is used to contain pointers, termed "resource identifiers," which are each associated with a fully qualified URL, for data that is located either on server content database 51 or anywhere on the networks to which server A 17 is connected. Thus, server resource database 55 contains a look-up table of resource identifiers to find a fully qualified URL to which a particular resource identifier is associated. In the preferred embodiment, server resource database 55 does not contain anything other than the look-up table for locating resources. As mentioned above, server content database 51 is not used to contain resources which are either infrequently accessed or extremely large in size. Through the use of server resource database 55, the resources which are not located locally can be accessed through the use of the URLs contained in server resource database 55.

Server content database 51 and server resource database 55, containing the set of data and pointers to data respectively, are logically a single database necessary to serve the users in the territory served by server A 17. As server resource database 55 contains resource location information as URLs referencing any resource on any possible site on the internet and locally in server content database 51, it is to be noted that the functionality of server content database 51 and server resource database 55 are combined to contain a virtually unlimited amount of data. In an alternate embodiment, there can be one database containing both data and pointers to data. The use of server content database 51 and server resource database 55 will be further described below in conjunction with the discussion of server InfoBite database 50.

As mentioned above, server InfoBite database 50, server content database 51, subscriber database 53, and server resource database 55 are accessed through the use of ODBC API 59. The use of ODBC API 59 provides a layer of transparency for accessing the databases. The function, features and benefits of the ODBC standard is well known in the art. In addition, ODBC API 59 can be replaced by another data management system without affecting the usefulness of the invention.

InfoFeed interface 57 is used to update server InfoBite database 50, server content database 51, subscriber database 53, and server resource database 55. In the preferred embodiment of the invention, content provider A 5, content provider B 7, content provider C 9 and content provider D 11 would use InfoFeed interface 57 to update the databases contained in server A 17 through the use of ODBC API 59. Access to InfoFeed interface 57 is obtained either through the use of network A 3; such as the case for content provider A 5, content provider B 7, content provider C 9 and content provider D 11; a modem bank, such as the case for content provider E 6; a satellite link, such as the case for content provider F 8; a direct connection, such as the case for content provider G 10; or any other communication infrastructure allowing the receiving and transmitting of data. Thus, in the preferred embodiment, InfoFeed interface 57 contains an interface for the internet, modems, satellite transceivers, and direct connections.

InfoFeed interface 57 enables content providers to update data and resources on server A 17 for specific subscriber locations and times. Thus, content providers may feed information only to those InfoCast servers matching a specific criterion. For example, content provider A 5, while sending news events which are global in nature to the InfoCast server in California, can also limit the type of weather information that is sent to the California InfoCast server to weather conditions which are local to California. InfoFeed interface 57 can also actively contact a content provider over network A 3 without initial contact from the content provider so as to "search" the internet for new content which might be interesting to users of the system.

As described further in connection with FIG. 4, InfoFeed interface 57 contains a reporter for each content type, as described below, each reporter being responsible for integrating with content providers to receive information, storing the information retrieved from content providers, and responding to the information transfers initiated by content providers.

Items of information that are sent to InfoCast servers such as server A 17 from content providers are collectively termed "InfoCasts." An InfoCast can consist of either a data file containing one or more separate articles, or a video/audio feed. Thus, an InfoCast from content provider F 8 would consist of a multimedia feed containing one or more video segments along with any associated audio while an InfoCast from content provider A 5 consists of a text file containing one or more news stories. Although in the preferred embodiment, an InfoCast contains information from several content providers, in an alternate embodiment, an InfoCast can contain information from a single content provider.

For each item contained in an InfoCast, InfoFeed interface 57 will create an "InfoBite," which can be sent to a user in lieu of the full item, as described below. Each InfoBite consists of a title, summary information for the associated item in the InfoCast, such as keywords, category names or titles; and data necessary for a user to: (1) obtain a corresponding item of information from which an InfoBite is generated; (2) obtain a cross reference to an item of information; or, (3) perform certain "InfoActions," as described below. In addition to the methods described below, InfoBites can also be generated by using a custom InfoBite editor.

In the preferred embodiment, the part of each InfoBite that is summary information for each particular item in an InfoCast is created by the content provider providing the InfoCast. For example, in the case where the information is a news story, summary information can be the title of the story. In another example, where the item of information is a graphic, summary information can consist of a caption or title of the graphic. In yet another example, where a content provider supplies a video/audio feed, summary information can consist of a title for a video segment available for viewing. In the case where the content provider provides a multimedia feed, such as content provider G 10, summary information can be transmitted to InfoFeed interface 57 using a separate portion the transmission channel, such as the vertical blanking interval.

In situations where summary information is not provided by a content provider, InfoFeed interface 57 will generate summary information as a portion of text from the beginning of a text item if the item is a text file, or a title if the item is a graphics file, an audio file, or a series of video frames. It is to be noted that summary information for different types of files can be placed in a single InfoBite. For example, summary information for a video/audio segment will consist of both a title for the video segment and a title for the segment of audio data. In addition, the resource identifiers for the video and audio data will be included, as described below, so that a client may retrieve those resources.

As described above, each InfoBite also contains a set of resource identifiers. In the preferred embodiment, each resource identifier is a bit pattern generated by InfoFeed Interface 57 for each URL to be included in an InfoBite. Resource identifiers are especially useful in low-bandwidth implementations—such as the short message services provided by a cellular telephone network, e.g., network B 21, or a two-way paging system—as bandwidth is saved by transmitting only a small bit pattern resource identifier instead of a fully qualified URL for a resource or the resource itself.

The format of an InfoBite is shown below in Table 1:

TABLE 1

InfoBite Packet Format

| Field | Example | Description |
|---|---|---|
| Version_ID | 01H, 02H | Identifies the broadcast version to the InfoCast Browser. Byte 1=major, Byte 2=minor. |
| Packet_ID | 0H | Identifies the packet type, such as a control message, resource message, InfoBite, etc. |
| Roaming | 0H | Indicates if the InfoBite is valid outside the domain it is received in. |
| Location_Bit | 0H | Indicates if the InfoBite is location specific. It tells the parser if there is a 4 byte identifier in the data field of the InfoBite indicating the InfoBite's longitude and latitude. |
| Time_To_Live | 0H | Indicates how long the InfoBite will remain in the client system. |
| Resource_ID | 000H | Enables content providers to brand their content with icons or bit maps. |
| Topic | 00H | Identifies the topic for categorical placement for client. |
| Title | | Combined with a domain number, this serves as a unique identifier for the InfoBite. |
| Data | | Contains data for the InfoBite. This optionally contains other fields which are parsed if necessary. |
| Number_of_Actions | | The number of actions contained in the InfoBite. |
| #Action_Type | | Tells client chow to interpret Data Field of InfoAction as contained in Table 2. |
| #Cost | | The cost of taking the action. The number relates to the Configuration Bite's Current Type |
| #Resource_Identifier | | Enables content providers to brand their content with icons or bit maps. |
| #Title | | Title for the InfoAction |
| #Data | | Data for the InfoAction. |

After an InfoBite containing one or more resource identifiers is transmitted to a user, if the user wishes to retrieve an article or item identified by a resource identifier, a request is made by the client to the InfoCast server to send the fully qualified URL associated with the resource identifier to the client. The request is made by the client transmitting the resource identifier to the InfoCast server. The InfoCast server will either transmit the fully qualified URL associated with the resource identifier, or, bandwidth permitting, transmit the story or item to the client.

After receiving the fully qualified URL, the client can then initiate an InfoAction to retrieve the item identified by the fully qualified URL. In the preferred embodiment, large files and resources are not stored locally by InfoCast servers but are only accessible by using the fully qualified URL to retrieve the resource at the original storage location of the resource,.

As described in Table 1, above, there are different types of InfoActions, identified by the Action_Type field. These InfoActions allow the user to perform actions, such as access the internet, initiate voice calls, and process scripts, on the client. When the InfoAction is executed by the browser, the Action_Type field is used to determine the way in which the information in the Data field is interpreted. For instance, an Action_Type code of "00H" tells the browser that the Data field of the action contains a URL and a WWW browser should be executed using the URL as a parameter. Alternatively, Action_Type code of "03H" tells InfoCast browser 89 that the Data field of the action contains actual HTML text. In the latter case, InfoCast browser 89 may save the text as a file and a WWW browser would be run using the name of the locally saved HTML file as a parameter. In this way, the HTML file can be viewed. Table 2, below, describes the contents of various InfoAction Data fields and suggested codes which could be used. It should be noted that specific "helper" applications used to process the data in the InfoActions can be determined via user preferences. For instance, an HTML browser such as Netscape© could be used to read or view HTML documents. Alternatively, the user could configure the InfoCast browser to process and display the HTML code if the InfoCast browser supports HTML. It should also be noted that other types of actions which are not defined in Table 2 can be supported easily using the provided structure. The InfoActions supported in the preferred embodiment are contained in the table below:

TABLE 2

Supported InfoActions

| Action_Type | Code | Transfer Media | Data Field | Suggested Application | Description |
| --- | --- | --- | --- | --- | --- |
| Internet Access | 00H | Data | URL | WWW Browser | Internet access phone number, if needed, is obtained from client configuration tables. |
| Download InfoCast Resource | 01H | Message | List of Resource Identifiers | InfoCast | Once the FTP server and file name for the resource has been found, action 00H is used to retrieve the resource. |
| Voice Connection | 02H | Voice Call | Phone number | TAPI Phone Dialer | Makes a person to person call. |
| Generate Form | 03H | None | Resource ID or HTML document | InfoCast | If the first bit of the Data is a "1", then an HTML form. Otherwise, a resource number follows and the action 01H is performed before the form is shown. |
| Send Message | 04H | Message | 3 bit transport ID, number & list of addresses, message data | InfoCast | Feedback to content/service providers |
| Scripting Language | 05H | None | Scripting code | InfoCast | Process JAVA or other scripting code such as Telescript. |

It is to be noted that as resources are also cached locally on clients, such as in client content database 72, a client will first check to see if the resource to be requested from the InfoCast server is contained locally on the client through the use of the resource identifier and client resource database 71. If the resource or file is contained locally and has not been deemed to be outdated by checking the resource's expiration time stamp, then the local resource will be accessed and there will be no need to contact InfoCast server, except to log the access in order to update the user's profile, as described below.

It is also to be noted that in cases where an item received by server A 17 is a non-text element such as a graphic, a sound sample or a video segment, InfoFeed interface 57 can create summary file of a smaller graphic that is a "thumbnail" version of the graphic, a compressed or limited portion of the audio sample, or a series of frames from the video segment, respectively, store the created summary file into server content database 51, assign a resource identifier for accessing the created summary file, and include the resource identifier for the created summary file inside the InfoBite generated by InfoFeed interface 57 for, the item along with any textual summary information to be included in the InfoBite. Client A 23 can then have the option of retrieving a non-textual summary, or clip, of the item before retrieving the complete item. For configurations where sufficient bandwidth exist, users are sent the complete item of information upon which an InfoBite is based.

In addition, InfoFeed interface 57 can also process electronic mail (e-mail) messages directed at a set of users in the territory served by server A 17 and create one or more InfoBites to be transmitted to the users. In cases where there are one or more attachments to the e-mail message, InfoFeed interface 57 would process those attachments in the manner described for files above. Thus, any attachments to the e-mail message would be stored in server content database 51 and each assigned a resource identifier to be stored in server resource database 55. Similar to other resources, attachments would be stored in server A 17 until they are requested by client A 23. InfoFeed interface 57 would allow content providers to create InfoBites by sending e-mail messages with attachments.

Schedule/resource controller 61 is responsible for filtering the InfoBites that are sent to a user based upon the user's profile as contained in the user's record and subscriber database 53—i.e., a subscriber profile filter, the user's current location—i.e., a locational filter, and the time of day—i.e., a temporal filter. Alternatively, the filtering may be performed on a client, such as client A 23. For example, an InfoCast from content provider A 5 can contain several news stories. Each of these news stories can be filtered as described below to assess its suitability to be sent to each user. In a low-bandwidth embodiment, only the InfoBites from the news stories that pass a user's filtering criteria are sent to the user. In cases where there is little or no bandwidth constraint, such as when a user is connected to the an InfoCast server through a LAN, the complete news story would be sent to the user in addition to the InfoBite associated with that news story. Future references to "InfoBite" will apply equally to a complete item or a summary of the item, unless otherwise noted. Detailed examples of the use of filters in schedule/resource controller 61 will be provided below.

In the preferred embodiment, schedule/resource controller 61 is also responsible for maintaining billing information for each user and sending it to billing service 63. It is to be noted that the maintaining of billing information can optionally be shifted to billing service 63. Alternatively, tracking of the billing information for each user's use of the system can be completely eliminated depending on which cost burden distribution model is used. For example, instead of having each user pay for using the system, the cost of maintaining the system can be borne by content providers who wish to advertise by sending InfoBites, by either a per client basis or a rate corresponding to a number of transmitted InfoBites. Schedule/resource controller 61 also checks server content database 51 and server resource database 55 to remove outdated resources—i.e., resources with time stamps that are expired—and to process InfoBites that have "awakened"—i.e., process InfoBites that were set at a previous time to be activated at a later preset time.

Server A 17 uses network A interface 65 to communicate with other InfoCast servers on network A 3 and can also communicate with other clients that are located on network A 3. Alternatively, if network A 3 is a proprietary network, then network A interface 65 would be configured to send and receive information over that network.

Server A 17 communicates with client A 23 through the use of messaging interface 67. For network B 21, which, as mentioned, is a GSM network, information from server A 17 is preferably sent via short message service (SMS) broadcasts at a cell level. In addition to carrying InfoBites, SMS broadcasts can also carry information to update client resource database 71, client content database 72, and the client configuration of client A 23. Alternatively, if server A 17 is sending information to client C 29 or client D 31 through the use of local area network 27, then messaging interface 67 would be configured for the protocol that is used by the local area network—e.g., Transmission Control Protocol/Internet Protocol (TCP/IP), AppleTalk® (AppleTalk is a registered trademark of Apple Computers, Inc.), or Netware® (Netware is a registered trademark of Novell, Inc.).

Continuing with FIG. 3, after client A 23 has received InfoBite messages over network B 21 through the use of messaging interface 79, InfoCast client 77 then updates client InfoBite database 73 and, as necessary, client resource database 71 and client content database 72 through the use of ODBC API 75. ODBC API 75 is functionally identical to ODBC API 59 in that it allows InfoCast client 77 to access client resource database 71, client content database 72 and client InfoBite database 73 regardless of the type of database software and hardware system on which client resource database 71, client content database 72, and client InfoBite database 73 are operating.

After InfoCast client 77 has updated client resource database 71, client content database 72 and client InfoBite database 73 with the information received via an SMS broadcast, InfoCast browser 89 is responsible for displaying the new information. In the preferred embodiment, InfoCast browser 89 is notified of the need to display new InfoBites by InfoCast client 77. InfoCast client 77 will also remove outdated information from client resource database 71, client content database 72 and client InfoBite database 73 so as to free up database resources.

As InfoCast browser 89 displays the new information, InfoCast browser 89 maintains a record as to what the user finds interesting as the user is browsing the delivered information. InfoCast browser 89 will send this log back to schedule/resource controller 61 periodically as bandwidth permits. This feedback and data gathering process is discussed in describing FIG. 5, below.

Client resource database 71 contains a subset of the information contained in server resource database 55 of server A 17. Server resource database 55, in turn, holds a subset of the logical server resource database, the logical server resource database being the logical database representing the information in all of the server resource databases existent in the system. In addition, client resource database 71 contains additional information that remained from any contact that client A 25 has had with other servers. For example, assuming again that: (1) there is one InfoCast server per each state of the United States; (2) server A 17 is the InfoCast server for California; and, (3) client A 23, which has its home InfoCast server in New York, has traveled to California. As client A 23 enters California, server A 17 is responsible for updating client resource database 71 and client content database 72 of client A 23 through the use of a client configuration message through which client A 23 can optionally retrieve a state map of California. Alternatively, server A 17 can automatically send client A 23 the map. Server A 17 is also responsible for sending any URLs for and/or data of local/regional maps of California where client A 23 is located. Client resource database 71 and client content database 72 might still contain pointers and data from the New York InfoCast server and any other InfoCast server of the states through which client A 23 has traveled. The operation of updating client resource database 71 and client content database 72 during the roaming of client A 23 is detailed further below.

Client InfoBite database 73 contains the InfoBite messages sent via SMS broadcast from server A 17 and from any other servers with which client A 23 has had contact. As will be described below, client InfoBite database 73 is constantly being updated as any InfoBite messages which are time sensitive and no longer useful—e.g., traffic information—are removed from client InfoBite database 73 on a regular basis as needed to conserve space.

It is to be noted that the set of server databases—e.g., server InfoBite database 50, server content database 51, subscriber database 53, server resource database 55—and the set of client databases—e.g., client resource database 71, client content database 72 and client InfoBite database 73—do not need to be contained in server A 17 and client A 23, respectively. Instead, any and all of the databases mentioned can be contained outside of the InfoCast server and client for which they hold information. For example, instead of having a distributed database for the subscriber database, wherein each InfoCast server has a subset of the logical subscriber database, there can be one subscriber database, which is both the physical database and the logical database, contained somewhere on the network such that all subscriber information would be contained on that database. The preferred embodiment is to have a physically distributed database since access time is shortened if the information to be accessed is contained locally. Also, if the information is contained locally, whenever communications between the clients and servers are not present, database dependent operations will be minimally affected.

Back channel interface 81 in the preferred embodiment is a cellular data call. Thus, when application A 83 in the above example needs to access content provider A 5 to perform an FTP file transfer, application A 83 will use back channel interface 81 to dial into an internet service provider using a protocol such as the point to point protocol (PPP) or the serial line internet protocol (SLIP), providing client A 23 with access to the internet, and then perform the FTP file transfer over the internet. Alternatively, back channel interface 81 can be networking hardware to allow access by application A 83, application B 85 and InfoCast browser 89 to a TCP/IP network in the case where client A 23 is located on a local area network implementing TCP/IP. For example, the back channel interface in client C 29 would be networking hardware to allow client C 29 to communicate over local area network 27.

Figure 4:
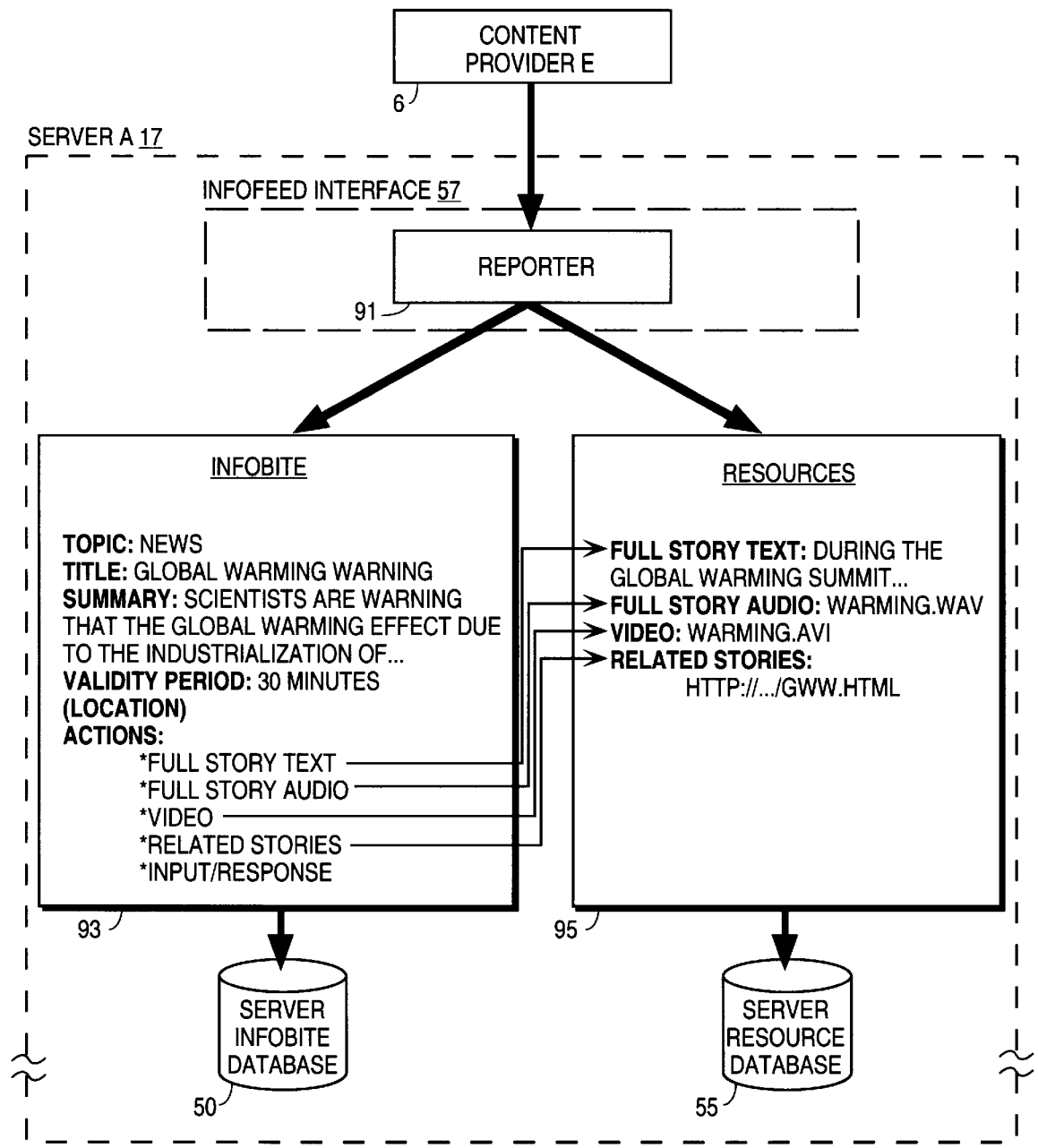
FIG. 4 illustrates a reporter of a server configured in accordance with the preferred embodiment of the invention.

FIG. 4 illustrates a logical diagram of a reporter 91 residing in InfoFeed interface 57 of server A 17 parsing an InfoBite 93 and a set of associated resources 95 for storage in server InfoBite database 50 and server resource database 55 of server A 17.

In FIG. 4, content provider E 6 is a commercial service, such as CNN@Work™, which provides a real time news service to reporter 91. Reporter 91 is configured to receive the InfoCast information provided by content provider E 6 and store InfoBites and the resources related to each InfoBite in InfoBite database 50 and Server Resource database 55 of server A 17.

For example, InfoBite 93 contains a news story with the title "Global Warming Warning" and has associated resources 95. Associated resources 95 may include a full story text, a full story audio, a video clip, and an URL to a related story. In the preferred embodiment, each of the resources in associated resources 95 is referenced by a fully qualified URL and thus, just the URLs may be stored in server resource database 55. The resources can be stored in server content database 51 (not shown in FIG. 4) or stored outside server A 17 in content provider E 6.

Figure 5:
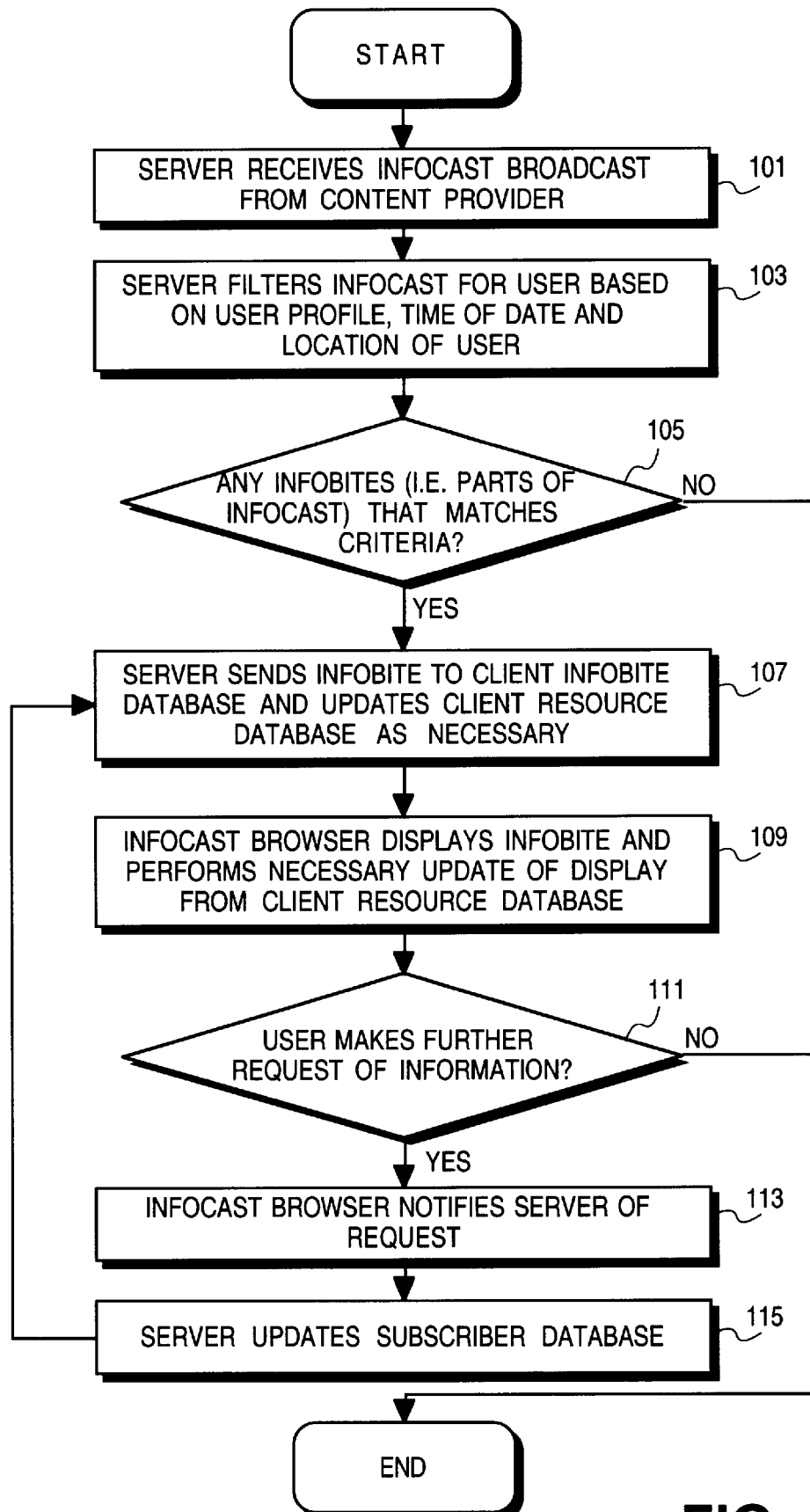
FIG. 5 is a flow diagram of a normal broadcast operation from a server to a client.

FIG. 5 is a flow diagram of the preferred operation of the invention. The description of FIG. 5 will be integrated with a detailed example, wherein the filter used by schedule/resource controller 61 will be based on the time of day, the location of the user, and user profile criteria. Thus, the filter used by schedule/resource controller 61 is composed of three filters, a temporal filter, a positional filter, and a subscriber profile filter.

In Block 101, referring back to FIG. 1 and FIG. 3, content provider B 7, as described above, is an HTTP server configured for having HTML pages containing real-time news. In this example, HTML pages containing real-time traffic reports are received by server A 17 from content provider B 7. InfoFeed interface 57 accesses the HTML pages from content provider B 7 through network A 3. As mentioned before, in the preferred embodiment, network A 3 is the internet. Alternatively, network A 3 can be any private or public network over which data can be transmitted and received. In the preferred embodiment, the HTML pages received from content provider B 7 are first received by InfoFeed interface 57 and then processed by a reporter capable of processing HTML thereby creating one or more InfoBites. Any created InfoBites will be stored in server InfoBite database 50 through the use of ODBC API 59. Any resources associated with each InfoBite will be stored in server content database 51 and server resource database 55 through the use of ODBC API 59. For example, an InfoCast server might receive an InfoCast containing traffic information for areas which are not served by the InfoCast server. In that case, only the traffic information relevant to the areas served by the InfoCast server will be processed into one or more InfoBites.

In Block 103, for each user currently served by server A 17, schedule/resource controller 61 filters the traffic report InfoBites by using the criteria of the time of day and the location of each user to decide which InfoBites—i.e., the parts of the InfoCast that pertain to the particular user—server A 17 will send to each client. For example, once again assuming that there exists one InfoCast server per each state of the United States and server A 17 serves the state of California, if client A 23 is currently located in Los Angeles, then schedule/resource controller 61 will filter out any traffic information InfoBites that does not pertain to traffic around a predetermined area around the user—e.g., schedule/resource controller 61 would filter out all traffic data that does not pertain to traffic around Los Angeles County, where the user is currently located. A detailed example of the preferred embodiment of a filter will be described below with regards to FIG. 7.

In Block 105, if there are any parts of the InfoCast traffic information that relate to the user, then operations in FIG. 5 will continue with Block 107. However, if there are no InfoBites that match the criteria of time of day and location of the user—i.e., no part of the InfoCast contains traffic reports for traffic within Los Angeles County—then operations in FIG. 5 will end.

In Block 107, assuming that there is at least one InfoBite that matches the time of day and location of user criteria, schedule/resource controller 61 will send that InfoBite to client A 23 through the use of messaging interface 67. This InfoBite message is sent as an SMS message over the GSM system of network B 21. Also, if the client resource database 71 does not contain the required resource to properly display the traffic information InfoBite, such as a map of the freeway system or a map of the surface street on which the user is located, then client A 23 may, if desired, either: (1) query schedule/resource controller 61 to retrieve that information in server content database 51 through the use of ODBC API 59 over network B 21 as via SMS messages, a direct data call, or a network connection; (2) query schedule/resource controller 61 to send the fully qualified URL associated with the resource identifier assigned to the map so that client A 23 can retrieve that map using back channel interface 21; or (3) not download the map and display a standard icon to inform the user that a map is available for downloading.

Alternatively, in low bandwidth situations, the additional resources necessary for displaying the InfoBite traffic information are transferred to client A 23 from server A 17 only if, as in Block 109, the traffic information InfoBite is displayed. In an alternative operation, the loading of these additional resources can be delayed, thus allowing a reduction in network traffic but can increase display time if the additional resources have to be loaded. The traffic information InfoBite and also any resources received from server A 17 by client A 23 through the use of messaging interface 79 over network B 21 is processed by InfoCast client 77 and stored into client resource database 71, client content database 72 and client InfoBite database 73 through the use of ODBC API 75. Client InfoBite database 73 is also maintained by removing all outdated or time-sensitive InfoBites which are no longer needed. Operation in FIG. 5 will then continue with Block 109.

In Block 109, InfoCast browser 89, after being notified of the receipt of new information, will retrieve the traffic information InfoBite from client InfoBite database 73 and display it on screen. InfoCast browser 89 will also retrieve any resources necessary from client resource database 71 to display the traffic information InfoBite. Thus, if the InfoBite contains traffic data of the freeway system of Los Angeles and the map of the freeway system of Los Angeles is not presently on screen, then InfoCast browser 89 will first load the map of the freeway system of Los Angeles from client content database 72, if the map is local to client A 23, through the use of ODBC API 75 and display it on screen while InfoCast browser 89 loads the traffic information InfoBite from client InfoBite database 73 and displays that traffic information InfoBite. As mentioned in Block 107, the map of the freeway system of Los Angeles can alternatively be loaded from server content database 51 of server A 17 or from the resource identifier. Operation in FIG. 5 will then continue with Block 111.

In Block 111, after the traffic information InfoBite has been displayed in Block 109, if the user performs an InfoAction, such as requesting greater detail of the traffic condition for a particular freeway, then operation in FIG. 5 will continue with block 113. Otherwise, if the user does not make a further request of information, then operations in FIG. 5 will end. A description of the operation of the retrieval process is contained below, in FIG. 8.

In Block 113, InfoCast browser 89 receives the request of the user for the performing of an InfoAction, performs the InfoAction, and logs the request for notifying schedule/resource controller 61 of the user's request. Depending on the InfoAction to be performed, an InfoCast server or a content provider might be used to service the request.

In the preferred embodiment, where server A 27 is to process the request, the request is made through the use of messaging interface 79 of client A 23, network B 21, and messaging interface 67 of server A 17. Alternatively, the request can be made through back channel interface 81 wherein client A 23 can initiate a data call to an internet service provider or, alternatively, contact server A 17 through the use of a local area network if client A 23 has access to a local area network. For example, Clients C 29 and D 31 and clients E 35 and F 37 would use local area networks 27 and 33, respectively, to contact servers A 17 and B 19, respectively.

The notification of server A 17 of the logged actions of the user can be done either through back channel interface 81 or messaging interface 79. In the preferred embodiment, the notification is performed periodically in that the record of the interactions of the user are queued to be transmitted as a series transactions to save bandwidth. The log can also be transmitted to server A 17 whenever client A 23 contacts server A 17 to service an InfoAction, thus saving the bandwidth that would be used to send the individual log of each InfoAction performed by the user.

In Block 115, after schedule/resource controller 61 has received the logs of the InfoActions performed by the user, schedule/resource controller 61 will update subscriber database 53. This update will revise the user profile contained as records in subscriber database 53 and, if server A 17 is not the home InfoCast server of client A 23, then server A 17 will send a message to the home InfoCast server of client A 23 to update the home InfoCast server's subscriber database. After schedule/resource controller 61 updates subscriber database 53, operation will then return to Block 107 and repeat as described above.

In addition to the traffic report example as described above, another example would involve the use of the user's profile in addition to the time of day and the location of the user for businesses which wish to advertise their services or products depending on additional criteria. For example, eating establishments may wish to send advertisements to the users located near each establishment's respective vicinity close to mealtimes. These advertisements may contain menus or daily specials and, in addition to being targeted to specific users based on their location and the time of day, can also be targeted based on the user's food preferences in subscriber database 53. Thus, for example, if a user is a vegetarian, schedule/resource controller 61 would only forward the InfoBites from vegetarian eating establishments or only forward the InfoBites containing the vegetarian specials from the eating establishments.

In each of the examples mentioned above, each of the InfoBites sent to a user can contain InfoActions to perform other actions. For example, in the case above where InfoBites containing advertisements from vegetarian eating establishments are sent to the user who is vegetarian, the InfoBites can contain InfoActions for the user to retrieve menus, nutritional information for each item in the menus and addresses of the restaurants, in addition to InfoActions which allow the user to make reservations at the restaurants. In the preferred embodiment, as described above, the InfoAction would contain data allowing a user to: (1) retrieve one or more URLs referenced by the resource identifiers from schedule/resource controller 61; (2) send information; or (3) execute scripts either locally on client A 23 or remotely on server A 17. Thus, client A 23 can retrieve an HTML document containing menu information, or, an HTML document containing a form with which reservation information can be submitted, either normally or securely. In the case where the form is an often used document, and therefore probably cached locally by client A 23, client A 23 does not need to retrieve the document but can use the locally cached version of the form to submit reservation information.

Presently, roaming in cellular networks is implemented by devices (or terminals) periodically beaconing their ID's—i.e., phone numbers—to the nearest base station. Base stations also periodically broadcast cell ID and other control information to all terminals within range. Thus, each cellular device is always aware of its respective location, and the cellular network always knows the location of each terminal as long as that terminal is operating within range of a base station. When a cellular device client detects that the current cell ID has changed, it may send a request for configuration message, as described below, to its last known InfoCast server, or the appropriate InfoCast server responsible for the new territory, if known. The InfoCast server then translates the cell ID to a physical location—e.g., longitude/latitude—as well a domain location. There are two databases to which InfoCast servers must have access: one that maps cell ID's to physical locations, and one that maps physical locations to domains. The databases may be distributed or replicated across all InfoCast servers, or be part of the cellular infrastructure.

For non-cellular embodiments, the client software can determine location through various other means. One example is through the use of a GPS system in conjunction with a wired or wireless network connection to InfoCast servers, with the client periodically sending messages indicating its current location. The frequency of the messages being optionally set by the amount of distance moved or the user's preference. In this case, the InfoCast server determines when the client requires reconfiguration, and sends a configuration message to the client. If the client roams out of the territory served by the current InfoCast server, the new InfoCast server will send the configuration message. It is to be noted that that this example works with any location determining system which is broadcast based—i.e., where the client device listens passively for broadcast information from which location information can be calculated or deduced.

Another example for determining location uses an "active" technique. A well known example is the Olivetti Active Badge which uses a technique called "Beaconing". An Active Badge is attached to each user (or terminal). The Badge is a transmit only device. It periodically sends its unique ID to nearby base stations (in one embodiment, using infra-red signals). The locations of the base stations in the system are well known as there is a database that maps physical locations to base station ID's. Thus, the location of each Badge is determined by examining which base station last "heard" the beacon transmitted by the Badge. These base stations can then deliver the location information to InfoCast servers. Reconfiguration is similar to the process as described above. The InfoCast server can also optionally send location updates to the client, since there is no other way in the active technique for the client to determine its location.

For wired networks, where the client is stationary, a database which maps terminals using IP addresses to physical locations is used.

For other wireless networks, such as packet radio networks and paging networks, the methods discussed above can be used to perform location functions.

Figure 6:
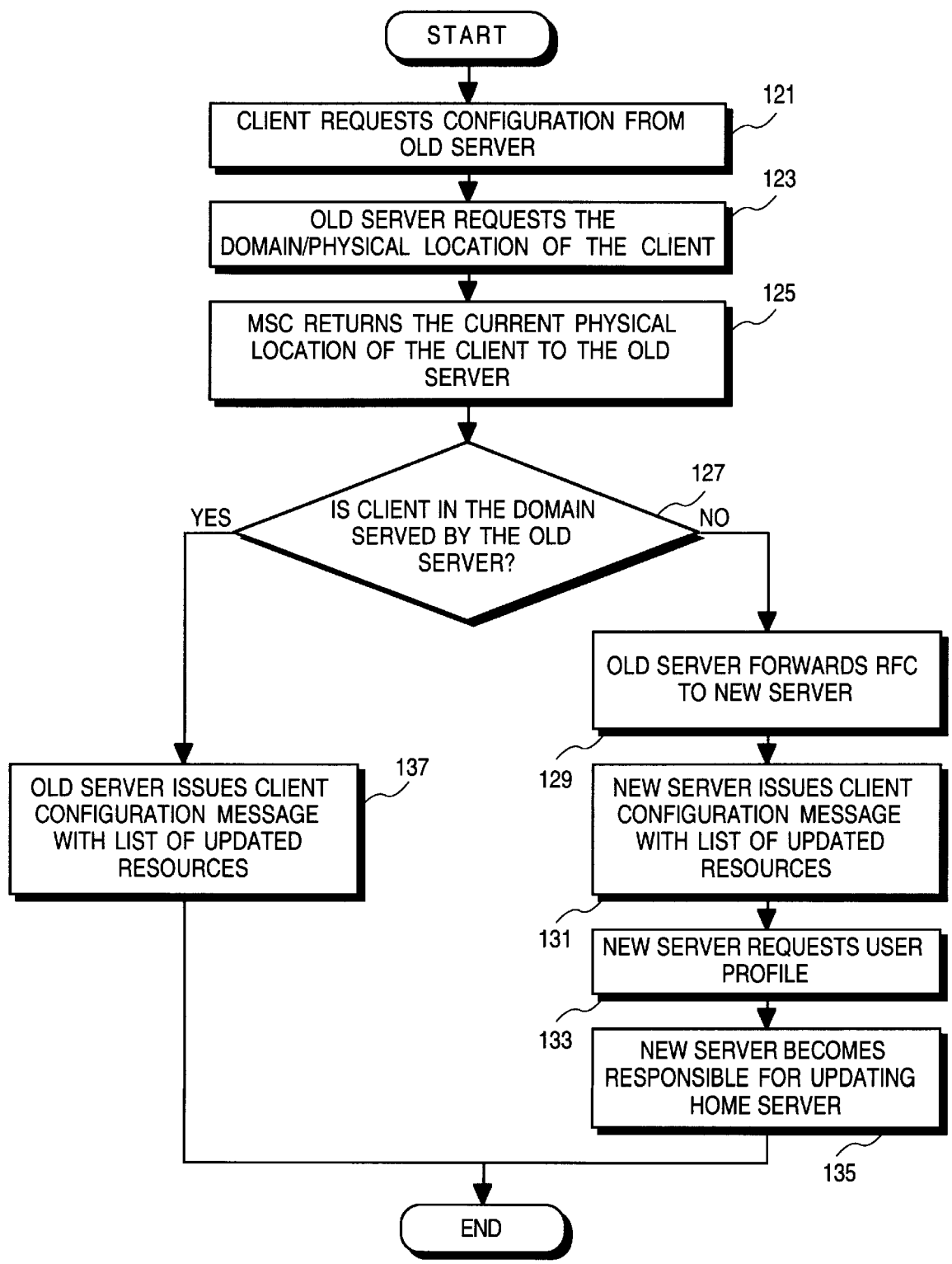
FIG. 6 is a flow diagram of a client configuration process for situations such as when a user moves to a territory served by a new server.

FIG. 6 illustrates the operation of the preferred embodiment of the invention dealing with client configuration for situations where a user moves out of the territory served by one InfoCast server and into the territory served by another InfoCast server. The operation described below also applies to situations when a user powers up client A 23 for the first time, whenever a client needs configuration information, or whenever a client receives a broadcast message over the SMS system containing domain information which does not correspond to what the client expects—i.e. when the client receives a domain number different from the one where the client is purportedly currently located at.

In describing FIG. 6, the example where a user moves out of the territory served by one InfoCast server and into the territory served by another InfoCast server will be used. Referring also to FIGS. 1 through 3, assume server A 17 is again the InfoCast server for California. Assuming that the territory from which the user has traveled is the state of Nevada, the InfoCast server serving the state of Nevada would transfer control to server A 17.

Referring to FIG. 6, operation begins in Block 121, after the user, or client A 23, enters the territory served by server A 17. In Block 121, client A 23 will request configuration information by sending a request for configuration (RFC) message to the old, or last known, InfoCast server, which in this case is the Nevada InfoCast server.

In the preferred embodiment, a RFC message is of the following structure:

TABLE 3

Request for Configuration Message

| Field | Data Size | Example | Description |
|---|---|---|---|
| Packet_Type | 1 Byte | 01H, 02H | Describes what kind of packet this is. |
| Home_Domain | 5 Bytes | 00000000H | A unique identifier for the client's home domain. |
| Current_Domain | 5 Bytes | 00000000H | A unique identifier for the client's perceived domain. |
| Last_Time_In_Domain | 5 Bytes (10 digit in BCD) | 1023952245 | Data of the last time the client was in the domain. |

TABLE 3-continued

Request for Configuration Message

| Field | Data Size | Example | Description |
|---|---|---|---|
| Current_Location | See below | | Optional field filled in by the client. Contains a Terminal Location Tuple |

For each domain in which client A 23 has been, client A 23 stores a value of the last time client A 23 was in that domain. The Terminal Location tuple is defined as a tuple <Terminal_ID, Location>, where (1) Terminal_ID can be: an IP address, if the terminal is on a LAN; a phone number, if the terminal is in a cellular network; or some other system assigned unique identifier for the terminal; and (2) Location can be: longitude/latitude pr cell identifier in a cellular network. In the preferred embodiment, Terminal_ID can be inferred from the network transport mechanism—e.g., the "sender" field of an SMS in a cellular network or the IP address in the header of a TCP/IP packet on a LAN.

In Block 123, after the old InfoCast server receives the RFC from client A 23, the old InfoCast server requests the current physical location of client A 23 from the MSC serving the area in which client A 23 is located. In this case, as seen in FIG. 2, client A 23 is located in the area served by MSC A 42 and, thus, in Block 125, MSC A 42 returns the physical location of client A 23.

In Block 127, the old InfoCast server determines whether or not client A 23 is in the area served by old InfoCast server—i.e., whether client A 23 is in Nevada—or if client A 23 is in an area served by another InfoCast server. The determination of which InfoCast server is responsible for serving client A 23 is performed through the accessing of a file mapping the geographical area contained in each domain and the InfoCast server responsible for the domain. In the preferred embodiment, the mapping information is contained in a look-up table. If the client is not in the domain served by the old InfoCast server, then the operations in FIG. 6 will continue with Block 129. Otherwise, the operations in FIG. 6 will continue with Block 137.

In Block 129, the old InfoCast server has determined that client A 23 is not in a domain served by the old InfoCast server but, instead, in a domain served by server A 17—i.e. somewhere in California. Thus, the old InfoCast server will forward the RFC received from client A 23 to server A 17.

In Block 131, server A 17 will issue a client configuration message with a list of updated resources to client A 23. What resources are contained in the list of updated resources is determined by server A 17 by identifying the last time client A 23 was in a domain served by server A 17 from the Last_Time_In_Domain field of the RFC message, and then appending any resources updated after that time to the list of updated resources. Client A 23 has the option at this point of retrieving any of the resources as desired.

In the preferred embodiment, the configuration message contains the following fields:

TABLE 4

Configuration Message

| Field | Data Size | Example | Description |
|---|---|---|---|
| Version_ID | 2 Byte | 01H, 02H | Identifies the broadcast version to the InfoCast Browser. Byte 1=major, Byte 2=minor. |
| Packet_ID | 4 Bits | 0H, 4H | 0H=Point to Point Configuration Bite, 4H=Broadcast Configuration Bite. |
| Domain | 5 Bytes | 00000000H | A unique identifier for the Domain. |
| Service_Provider_ID | 4 Bytes | | Identifies the local service provider for the client. |
| Internet_Access Number | Phone Number type | | Number for internet access. |
| InfoCast_Server Number | Phone Number type | | Number of the InfoCast_Server. |
| In-Box_Length | Variable size number | | Length of the In-Box text. |
| InfoCast_Server In-Box | Variable length text | /pub/InfoCast | Specifies directory where a client can place messages. |
| Services_Provided | 1 Byte | | Each Bit indicates a message service that is enabled. |
| Language | 1 Byte | | Indicates the language that will be used. |
| Currency_Type | 1 Byte | | Indicates the currency type for InfoActions. |
| Number_of_Resource_Identifiers | Variable size number | | Tells clients of how many resource identifiers that will follow in the Outdated_Resource_Identifiers field. |
| Outdated_Resource_Identifiers | 3 Bytes each | | Tells client which resource identifiers to invalidate. |

In Block 133, server A 17 requests the user profile from the home server of client A 23 as identified by the Home_Domain field of the RFC message. Thus, if the user's home InfoCast server is in New York, then server A 17 would contact the New York InfoCast server through the use of network A interface 65. For example, the New York InfoCast server can be server B 19.

In Block 135, as server A 17 is now the InfoCast server serving client A 23, server A 17 will be responsible for processing future requests from client A 23 and sending future InfoBites to client A 23. Server A 17 will also become responsible for updating the user's home InfoCast server with any changes in the user's profile record contained in subscriber database 53.

For example, server A 17 would update client resource database 71 and client content database 72 of client A 23, as requested, by using schedule/resource controller 61 to retrieve information from server resource database 55 through the use of ODBC API 59, and transferring that information over network B 21 using messaging interface 67 of server A 17 and messaging interface 79 of client A 23. InfoCast client 77 would then update client resource database 71 through the use of ODBC API 75. Thus, for example, by request of client A 23, schedule/resource controller 61 would transfer the state map of California and a regional map of the territory in which the user is currently located to InfoCast client 77 such that InfoCast client 77 can update client resource database 71 by removing the now unnecessary map of Nevada and loading the maps pertaining to the state of California in client resource database 71.

As discussed above, if the old InfoCast server determines that client A 23 is in a domain served by the old InfoCast server in Block 127, the operations in FIG. 6 will continue with Block 137. In Block 137, the old InfoCast server will send the configuration message with a list of updated resources to client A 23 in the manner described in Block 131.

After either branch, 137 or 129–135, is executed, operations will continued as described in FIG. 5, wherein schedule/resource controller 61 will distribute InfoBites after it filters the received InfoCast from the various content providers.

In an alternative mode of operation, where the client can determine which domain it is currently in by the receipt of periodic broadcast messages, the client can send the RFC message to the new InfoCast server directly. Thus, where client A 23 can determine that it is in a domain served by server A 17, client A 23 can send the RFC message to server A 17 containing the data stored by client A 23 telling server A 17 when client A 23 was last in a domain served by server A 17 in the Last_Time_In_Domain field.

As noted above, the modes of operation described for the situation where the user moves out of the territory served by one InfoCast server and into the territory served by another InfoCast server can be used for cases where an InfoCast client is first powered on and is thus unaware of its location. Thus, when the InfoCast client is first powered up, it has four options for initialization. The client can: (1) send a RFC message to the InfoCast server which it believes is the InfoCast server servicing the current domain as illustrated by FIG. 6, above; (2) do nothing while waiting for an InfoBite from the InfoCast server indicating that the current InfoCast server has changed and optionally sending a RFC to that InfoCast server; (3) do nothing while waiting for a broadcast configuration message from the InfoCast server serving the territory indicating the current domain and optionally sending a RFC to that InfoCast server; or (4) determine that the location has changed using the methods described above and sending a RFC to the InfoCast server serving the territory in which the client was powered up.

In an alternate embodiment, where the cellular network is configured to notify an InfoCast server when a new client has appeared in the territory served by that InfoCast server, the InfoCast server should send a configuration message to the new client automatically. In cases where the Olivetti Active Badge is being used, the Olivetti base station can be configured to notify the InfoCast server of the location of the client. Similarly, a GPS receiver can be used in the same manner for both the InfoCast server and client to obtain client location information.

In addition to the examples provided above for the different filtering criteria, another example is provided where the filtering criteria is based solely on the location of the user, such as for tourist information for travelers. For example, as a user enters a new territory, information about nearby eating establishments, rest stops, entertainment attractions, and tourist attractions can be automatically sent to the user. Specifically, where the user travels into a city, information about local attractions such as museums, theaters, and eating establishments would be sent to the user. As the user travels toward the outlying region of the city and information about the attractions located outside the city would be transmitted to the user.

Alternatively, location filtering can be used by companies that wish to target users located in different parts of a city, such as an affluent neighborhood. In addition, location information and time of day information combined—even without accessing the user's profile information—can serve to be useful criteria for filtering the InfoCast messages. Thus, in addition to the eating establishment example given above, an example can be seen where companies that provide electronic products and service would advertise at consumer electronic conventions such as Comdex®.

Other embodiments of the invention would include the ability to control the environment surrounding the user based on the time of day and the location of the user. For example, in FIG. 1, where server B 19 and client E 35 are connected via local area network 33, server B 19 can be a server located inside an office building while client E 35 is contained on a device such as the user's personal computer. The user can then be "located" through the use of the network address of the user's computer or through the use of a device such as global positioning system (GPS) transceiver. In cases where the position of the user is updatable, server B 19 and client E 35 can work together to change the environment in which the user is located, such as by turning on the lights of a room when the user enters the room, directing all telephone calls for the user to the telephone closest to the location of the user, or shutting off the air conditioning system when no users are present in the building.

As described above, the subscriber profile contained in the user's record is constructed by the user filling out a questionnaire. The data from the subscriber profile would be used to select an initial subscriber profile filter from a set of pre-configured subscriber profile filters. For example, default subscriber profile filters can be pre-generated for users who are over 40 years of age with an income level of at least $40,000, working in the consumer electronics industry; or for users who are under 30, live in New York and work in the medical profession. The subscriber profile filter would be combined with a temporal filter, which is based the time of day, and a positional filter, which is based on the user's location, to create the user's InfoCast server filter. Thus, based on the user's demographics, a default InfoCast filter is initially created through the combination of the initially chosen subscriber profile filter, the temporal filter, and the positional filter. These default InfoCast filters will be changed as the user changes locations, as time changes, and as the user profile changes, as described below.

Through the use of the user's subscriber profile in the InfoCast filter, InfoBites may be filtered on content alone. For example, the user may only want to view new articles relating to a list of interests that the user provides—e.g., sports news, world news, local news, and business news. The list of the types of news that the user is interested in can be contained in the subscriber profile record of the user and used to filter the news information as they arrive from the content providers as InfoCasts.

Figure 7:
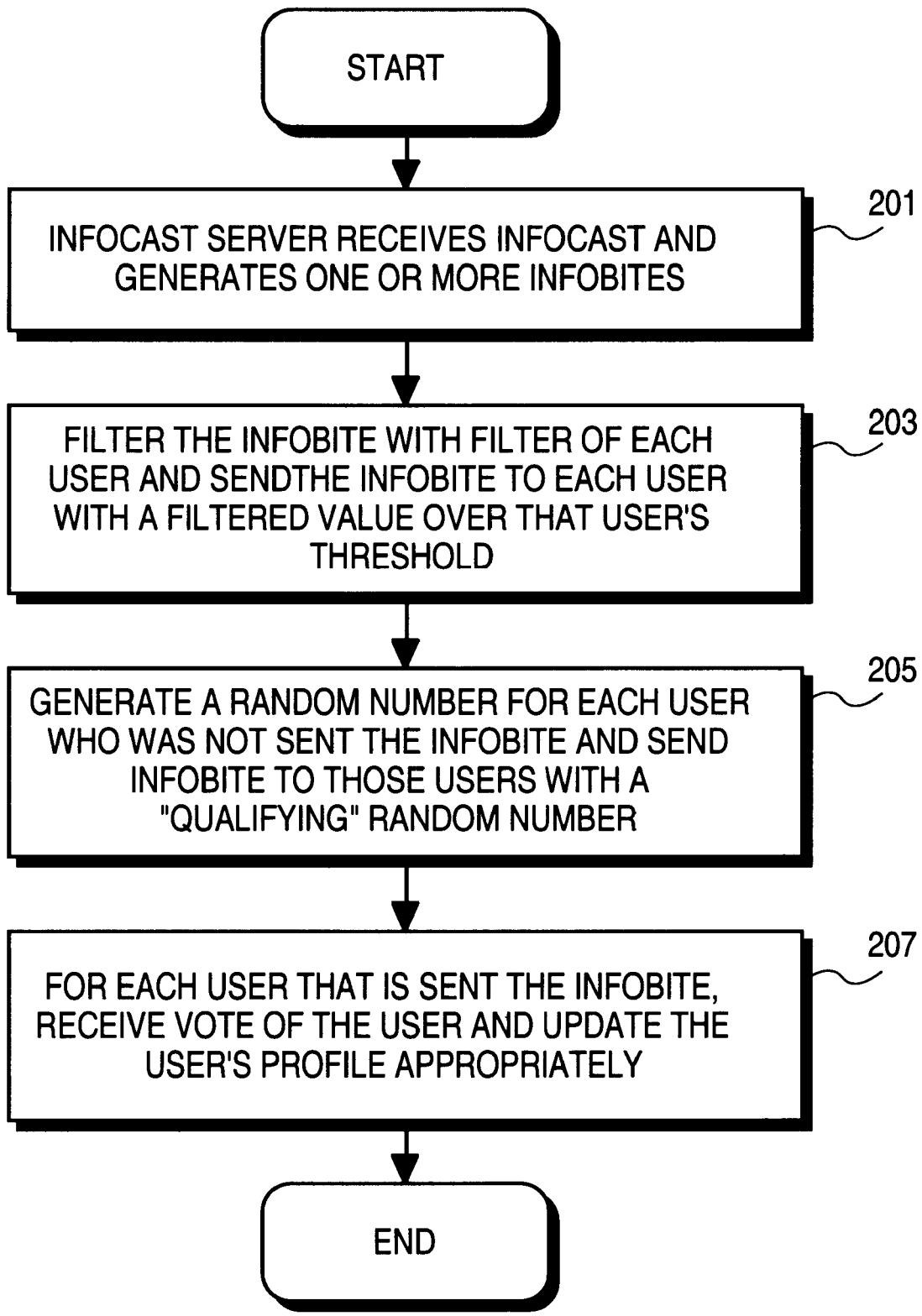
FIG. 7 is a flow diagram of a filtering and user profile updating process for the filtering of information which is sent to a client.

FIG. 7 is a flow diagram of the preferred embodiment of the operation of the filtering of InfoBites. In the description of FIG. 7, it is assumed that there are three users of the InfoCast system: persons A, B and C. Person A is an engineer, age 30, having the keywords "computers", "engineering", "politics" and "weather" contained in person A's user profile. Person B is an exercise therapist, age 23, having the keywords "exercise", "weights", and "fitness" contained in person B's user profile. Person C is a business person, age 42, having the keywords "fortune 500", "business", and "wall street" contained in person C's user profile.

In Block 201, an InfoBite is received. In this example, the InfoBite contains five (5) occurrences of the word "exercise" and five (5) occurrences of the word "weights" in an article with forty (40) words.

In Block 203, after the InfoBite is received, it is filtered for the keywords of users A, B and C. For each user, a percentage chance that the InfoBite would be interesting to the user is calculated using the following formula:

(keywords_found/total_words)*100=interest_%, where keywords_found is the total number of times all keywords appear in the InfoCast; total_words is the total number of words in the InfoCast; and interest_% is the percentage chance that the user would be interested in the InfoBite. If the InfoCast does not contain text—for example, when the InfoCast contains graphics or an URL—then the filter will use the keywords or title provided for each item for the filtering process. Thus, a score will be assigned to each InfoBite based on a fit of the summary information contained in a InfoBite and a user's InfoCast filter.

The value of interest_% is from 0 to 100. The value of interest_% will also be sent to the user at the end of the InfoBite so that further filtering can be performed on the client or an indication of the "closeness" of the match can be displayed. The value of interest_% can either be sent unchanged or as a compressed value representing, in one possible embodiment, one of three pre-set ranges of "high", "medium", or "low". In that embodiment, interest_% with values from 100 to 67, inclusive, are assigned "high"; 66 to 34, inclusive, are assigned "medium"; and 33 to 0, inclusive, are assigned "low". For example, if interest_% is calculated to be 50%, it can be sent to the client as the number "50" or can be sent as a compressed value of "medium".

At this point, a threshold value, which is the value above or equal to which the InfoBite's calculated score—i.e., interest_%—will have to be in order for the InfoBite to be transmitted to the user, can be used to automatically send the InfoBite to the user. This threshold value is implementation specific and can be configured by the user as needed.

In this case, the application of the filter of user B would result in a score of ((5+5)/40)*100=25%, while, the filters of users A and C would both result in a score of 0. If user B has a threshold of 20%, then user B will be sent the InfoBite.

Although the variable keywords_found is defined to be the total number of occurrences of all of a user's keywords in the story of an InfoBite in the preferred embodiment, the variable keywords_found can also be defined to be the total number of occurrences of all the user's keywords in the title of the InfoBite. Further still, instead of the title, a list of keywords for the InfoBite can be used. In any case, the variable total_words would be defined as the total number of words in the title or list of keywords in the InfoBite, respectively.

In Block 205, after the InfoBite is processed, a random percentage between 0% and 100% is generated for each user to provide a chance for the InfoBite to be sent to users who were not sent the InfoBite during the operation of Block 203. This random percentage will be used as a temporary threshold value, in place of the pre-defined threshold value of each user as mentioned in Block 203, to determine whether or not the InfoBite will be sent to each user. The InfoBite will be sent to each user with a calculated score that is higher than this randomly generated threshold value. Thus, during normal operations, the InfoCast filter will also allow some "random" information to be sent to the user along with any InfoBites that match the InfoCast filter for the user. The random information is necessary for discovering topics not currently covered in the questionnaire nor in the default profile. The amount of random information sent to the user can be decreased as the user's subscriber profile becomes more complete. Some randomness is always required so that new topics of interest can be discovered. In the preferred embodiment, it is inherent that the time and location information will also cause some randomness in the information that is sent to the user, as the time and location information is always changing. In an alternative embodiment, the user can be allowed to turn off the sending of all random information.

In this example, if the random percentages generated for users A and C are 0% and 56% respectively, then only user A will be sent the InfoBite as the calculated score of user A of 0%, from Block 203, is equal to the randomly generated threshold of 0%.

In alternate embodiments, a user can configure the range of random numbers generated so that the randomly generated threshold would never fall below a certain percentage. For example, user A can set a minimum threshold of 5%, under which no InfoBite would be sent.

Continuing with Block 207, after a user is sent the InfoBite, the user can respond with a message indicating that the user liked the contents of the InfoBite by selecting a button on screen and would prefer to receive more InfoBites in the future with that type of content. If the user so responds, a set of keywords that belongs to the InfoBite will be added to the user's list of keywords and the user's profile, which is contained on both the InfoCast server currently serving the user and the user's home InfoCast server, will be updated. A keyword will be added to the set of keywords even if the keyword to be added is already in the set. Thus, a user's list of keywords can have multiple occurrences of a keyword.

In this case, if user B responds positively to the InfoBite, then there will be two (2) occurrences of the word "exercise" and two (2) occurrences of the word "weights", in addition to the word "fitness". Thus, user B's list of keywords will contain: "exercise, exercise, weights, weights, fitness". Similarly, if user A is sent the InfoBite and responds positively to the InfoBite, then user A will have the words "weights" and "exercise" added to user A's list of keywords resulting in "computers, engineering, exercise, politics, weather, weights". No keywords will be added to a user's list unless the user responds positively to the InfoBite.

In an alternative embodiment, instead of requiring the user to notify the system that the user approved of the story, anytime a user responds to an InfoBite by either requesting more information or retrieving the full story, the system will assume that the user is interested in the InfoBite and the system will automatically add the keywords associated with the InfoBite to the user's list of keywords. In that situation, there would be a "Veto" button so that the user can veto the placement of the keyword in the user's list. In addition, instead of placing duplicate keywords in a user's list, the list of keywords can also contain a weight for each keyword. For example, user B's list of keywords, assuming user B approves of the content of the InfoBite, will contain "exercise, 2, weights, 2, fitness, 1".

In this way, the user will be able to modify his profile simply by responding to the InfoBite messages by, for example, requesting more information, and the scheduler of the InfoCast server will be able to refine the subscriber profile of the user, and thereby refine the user's InfoCast filter, based on the user's responses. As described above, the refining algorithm can be based upon many weighted averaging schemes familiar to persons skilled in the art, using the categories from the most recent and numerous responses to dominate the configuration of the InfoCast filters.

In addition to the methods discussed above, a user will also be allowed to modify the subscriber profile assigned to that user so as to further customize the selection of any information to be sent to the user. In the preferred embodiment, this would be done through the use of a graphical user interface offering the user interactive modification capability of the user's subscriber profile. Alternatively, the subscriber profile can be contained in a text file which the user can download, modify, and upload as needed.

Figure 8:
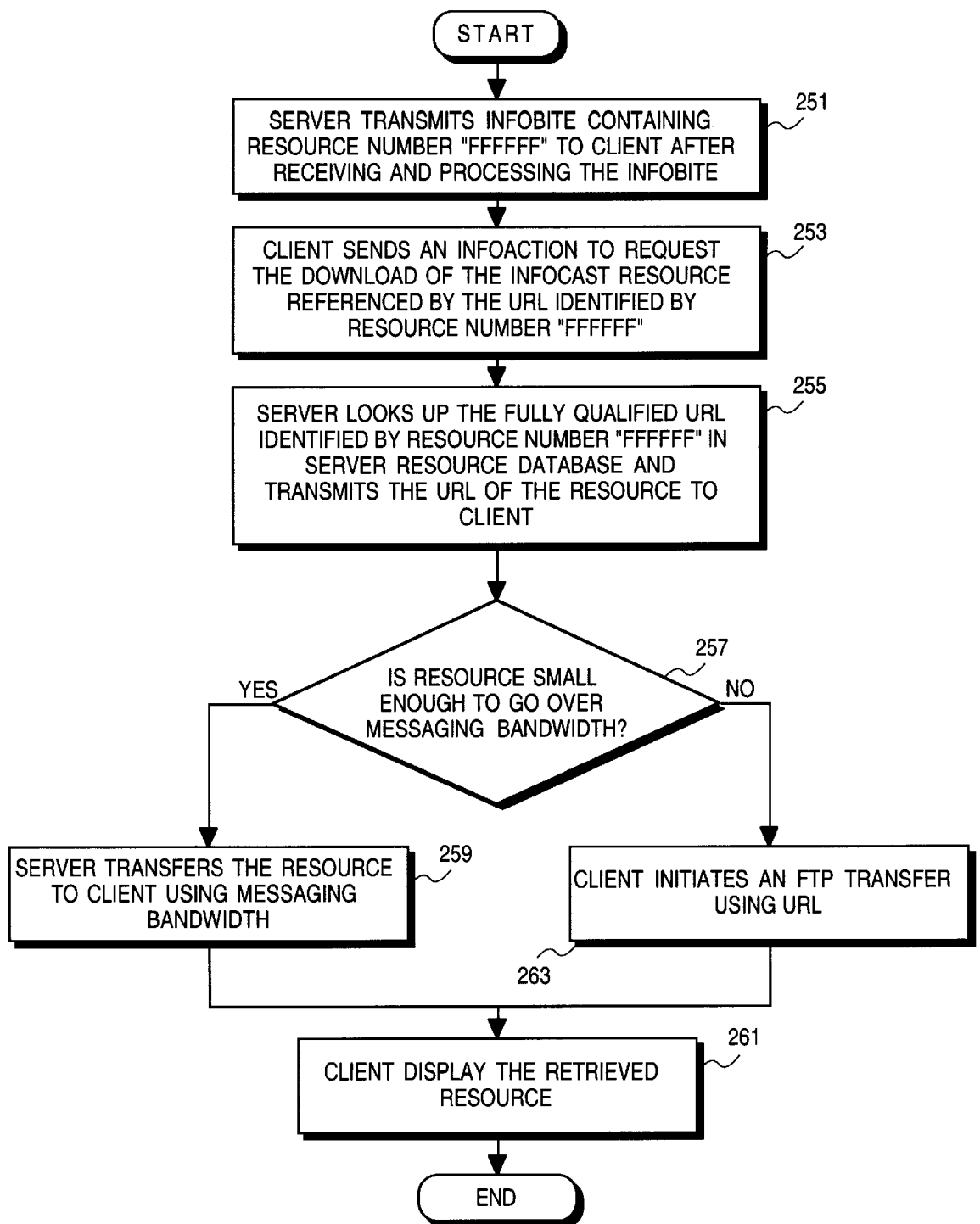
FIG. 8 is a flow diagram of a retrieval of resources operation by a client from the server.

FIG. 8 is a flow diagram of the preferred embodiment of the operation of the retrieval of resources by a client after the receipt of an InfoBite. As stated above, InfoBites can also contain data which allow the user and client A 23 to perform actions termed "InfoActions." In the preferred embodiment, an InfoAction has an action type, an action title and action data. The types of InfoActions that can be performed consist of actions such as the downloading of a related article to an InfoBite, and the initiation of scripts or programs on server A 17 or on client A 23 itself. In addition, InfoCast browser 89 uses InfoAction API 87 to launch application A 83 and application B 85, as necessary, to process any information that InfoCast browser 89 is not equipped to handle. Application A 83 in the preferred embodiment is an FTP client, and application B 85 is a browser configured to decipher HTML documents.

Referring to FIG. 4 and to FIG. 8, in Block 251, reporter 91 of server A 17 has received InfoBite 93 from content provider E 6 and processes InfoBite 93 by storing InfoBite 93 and the associated resources 95 in InfoBite database 50 and Server Resource database 55 of server A 17. Server A 17 then processes InfoBite 93 using the filtering process described above in FIG. 7 and transmits InfoBite 93 to each "interested" client. In this example, server A 17 transmits InfoBite 93 to client A 23.

As described above, each of the resources in associated resources 95 is referenced by a fully qualified URL stored in server resource database 55. The resources can be stored in server content database 51 (not shown in FIG. 4) or stored in content provider E 6. In addition, the fully qualified URL's are each assigned an unique resource identifier number contained in InfoBite 93. For example, the "Full Story Audio" resource, which is stored in server content database 51, can be referenced by the use of the URL: "FTP://FTP.infocast.net/stories/warming.wav". This URL is contained in server resource database 55 and is assigned a resource number of "FFFFFF".

In Block 253, after the user of client A 23 decides to retrieve the "Full Story Audio" resource, client A 23 sends an InfoAction to request the download of the InfoCast resource referenced by the URL identified by resource number "FFFFFF" from server A 17.

In Block 255, server A 17 looks up the fully qualified URL identified by resource number "FFFFFF" in server resource database 55 and transmits the URL to client A 23. In an alternative embodiment, where the resource requested is contained in server content database 51 of server A 17, server A 17 can send the resource directly to client A 23 instead of sending the fully qualified URL. Thus, in the alternate embodiment, unless the resource is not contained in server content database 51 of server A 17, the resource retrieval process can be shortened.

In Block 257, server A 17 will determine whether or not the resource requested by client A 23 is of a size small enough to be sent over the messaging bandwidth. If so, then operation in FIG. 8 will continue with Block 259. Otherwise, the operation in FIG. 8 will continue with Block 263.

In Block 259, if it has been determined that the resource requested is small enough to send over the messaging bandwidth, server A 17 will initiate a transfer for the "Full Story Audio" resource over the messaging bandwidth to client A 23 and client A 23 will store the resource in client content database 72.

In Block 261, after client A 23 has retrieved the "Full Story Audio" resource, InfoCast browser 89 is used to play the audio information. If the resource received is in a data format that InfoCast browser 89 cannot handle, client A 23 can call other applications, such as application A 83, to process the data.

In Block 263, after client A 23 receives the fully qualified URL, client A 23 initiates an FTP transfer using the URL and stores the resource retrieved in client content database 72 of client A 23. Operation in FIG. 8 will then continue with Block 261, as described above.

Another example is where an InfoBite that announces the availability of a demonstration program at an FTP site such as content provider B 7 contains a resource identifier to allow the user to initiate an FTP transfer by invoking an InfoAction. Thus, in the preferred embodiment, after retrieval of the fully qualified URL associated with the resource identifier either locally or from client A 17, InfoCast browser 89 calls application A 83 through the use of InfoAction API 87 to communicate with content provider B 7 through the use of back-channel interface 81. If InfoCast browser 89 is capable of acting as an FTP client, InfoCast browser 89 can use back channel interface 81 to perform the FTP file transfer over network B 21 by contacting an internet service provider. Alternatively, application A 83, instead of acting as a stand-alone application, can be an external code plug-in which InfoCast browser 89 can also execute through the use of InfoAction API 87.

Figure 9:
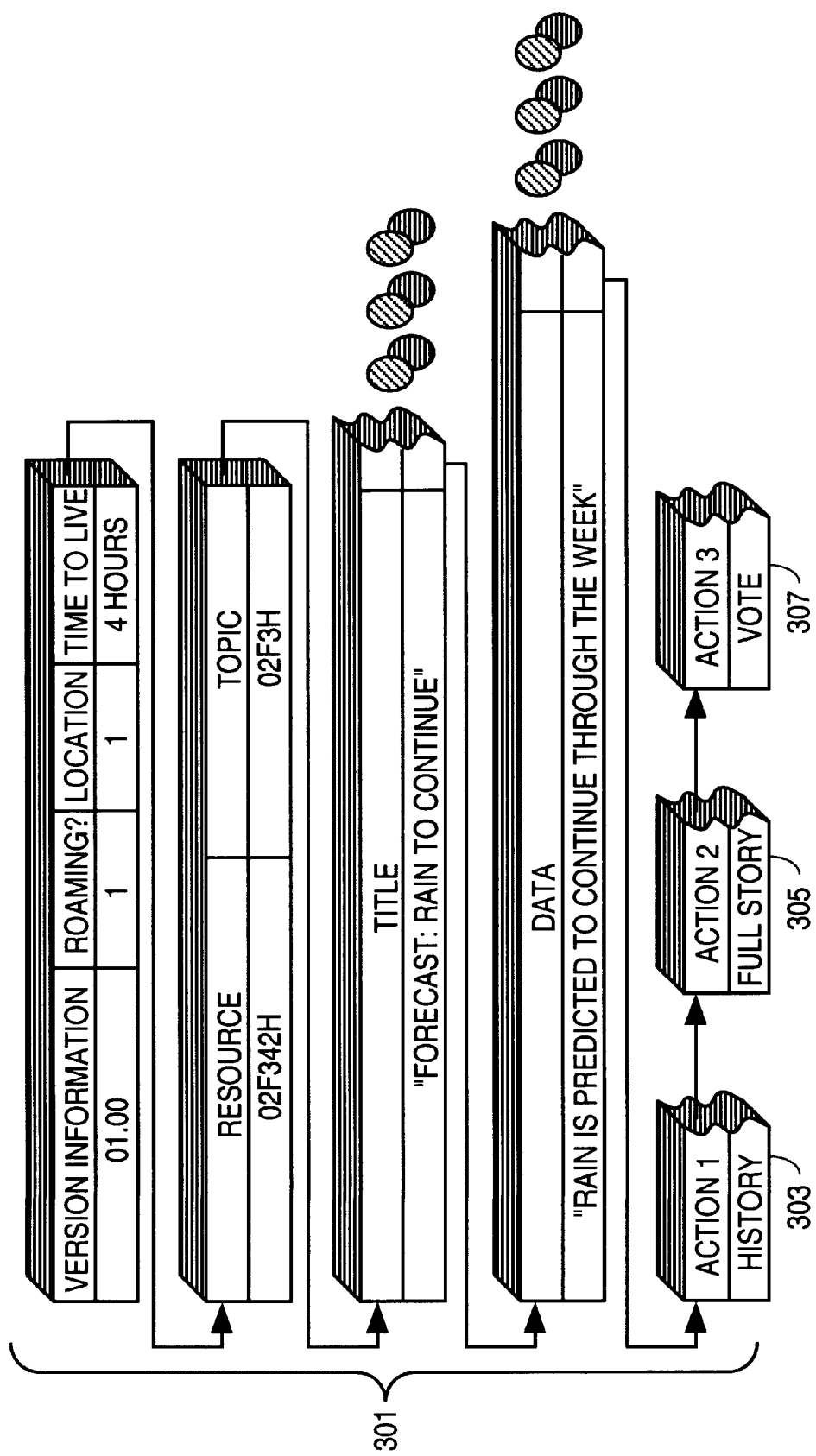
FIG. 9 illustrates an exemplary InfoBite configured in accordance with the preferred embodiment of the invention.

FIG. 9 illustrates an exemplary InfoBite 301 containing a first InfoAction 303, a second InfoAction 305, and a third InfoAction 307. The multiple InfoActions allow a client that receives InfoBite 301 to perform different InfoActions. For example, second InfoAction 305 will retrieve the "Full Story" of the article using a process as described in the discussion of FIG. 8, above.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A server comprising:
   an information interface for creating an InfoBite from received information including summary information and a resource identifier wherein said resource identifier is a bit pattern associated with a Uniform Resource Locator (URL) stored within a resource database;
   a message interface for coupling said server to a set of clients through a network; and
   a first receiver which receives and stores real-time location information of said set of clients, said receiver coupled to said information interface;
   wherein said server supports mobility of said set of clients through said receiver.

2. The server of claim 1, wherein said network is configured to pass cellular data.

3. The server of claim 1, further comprising a filter coupled to said messaging interface wherein said InfoBite pass said filter to said set of clients through said messaging interface.

4. The server of claim 3, wherein said filter is modified by said set of clients.

5. The server of claim 3, wherein said filter is automatically modified by an action of said set of clients.

6. The server of claim 3, wherein said filter further comprises:
   a temporal filter for filtering said InfoBite based on a set of time constraints;
   a positional filter for filtering said InfoBite based on a set of positional constraints; and
   a subscriber profile filter for filtering said InfoBite based on a set of constraints contained in a subscriber profile.

7. The server of claim 3, wherein said filter is a schedule/resource controller.

8. The server of claim 1, wherein said information interface further comprises:
   a mechanism which provides for self contacting at least one content provider without initiation by said content provider through a network interface and searching for new content based upon a predetermined criteria.

9. The server of claim 1, wherein said information interface is an InfoFeed interface.

10. The server of claim 1, further comprising:
    a data management system coupled to said information interface; and
    a server database unit coupled to said data management system.

11. The server of claim 10, wherein said data management system is an ODBC API.

12. The server of claim 10, wherein said server database unit comprises:
    a server InfoBite database;
    a server content database;
    a subscriber database; and
    said server resource database.

13. The server of claim 1, wherein said receiver includes:
    a mechanism for receiving a cell ID from said client; and
    a mechanism for translating said cell ID to a physical location and a domain location.

14. The server of claim 1, further comprising:
    a second receiver for receiving resource identifier;
    wherein said messaging interface transmitting a resource identified by said resource identifier is said resource identifier is available in said server and said resource transmittable by said messaging interface;
    said messaging interface transmitting said uniform resource locator (URL) if said resource is not in said server;
    said messaging interface transmitting said URL if said resource is not transmittable by said messaging interface.

15. A client comprising:
    a messaging interface for coupling said client to a server through a network;
    a transmitter coupled to said messaging interface for transmitting real-time location information to said server;

an information interface coupled to said message interface for receiving an InfoBite including summary information and a resource identifier wherein said resource identifier is a bit pattern associated with a Uniform Resource Locator (URL) stored within a resource database; and a browser coupled to said information interface;

wherein said browser displays said InfoBite.

16. The client of claim 15, wherein said browser is an InfoCast browser.

17. The client of claim 15, wherein said browser is adapted to transmit said resource identifier to said server for receiving a resource identified by said resource identifier.

18. The client of claim 15, further comprising:

a data management system coupled to said Information interface; and a client database unit coupled to said data management system.

19. The client of claim 18, wherein said data management system is an ODBC API.

20. The client of claim 18, wherein said client database unit comprises:

a client resource database;

a client content database; and a client InfoBite database.

21. The client of claim 15 further comprising:

a back channel interface coupled to said browser.

22. A method comprising the steps of:

receiving an information from a content provider;

generating at least one InfoBite from said information, said InfoBite including summary information and a resource identifier wherein said resource identifier is a bit pattern associated with a Uniform Resource Locator (URL) stored within a resource database;

filtering said InfoBite with a predetermined criteria of a set of clients;

sending said InfoBite to each of said set of clients with a filtered value over said predetermined criteria of each of said set of clients;

if at least one of said set of clients requests further information based on said InfoBite, providing said set of clients with said further information.

23. The method of claim 22, wherein said filtering step further comprises:

generating a random number for said set of clients who were not sent said InfoBite and sending said InfoBite to said set of clients with a qualifying random number;

receiving a vote from each of said set of clients for said InfoBite;

updating a profile of each of said set of clients based upon said vote.

24. The method of claim 22 wherein said step of sending said InfoBite further comprises the steps of:

receiving a request from a client for a configuration message;

requesting a physical location of said client;

receiving a current physical location of said client;

if a server is not a home server of said client, then issuing said configuration message with a list of updated resources;

requesting a copy of said client's profile from said home server;

updating said home server for changes in said client's profile; and if said server is a home server of said client, then issuing said configuration message with said list of updated resources.

25. The method of claim 22 wherein providing said set of clients with said information further comprises the steps of:

receiving an action to request a download of a resource identified by said resource identifier in said InfoBite;

looking up said resource identified by said resource identifier; and transmitting said resource to said set of clients.

26. A method comprising the steps of:

transmitting a real-time location of a client;

receiving an InfoBite through a messaging interface, wherein said InfoBite includes summary information and a resource identifier wherein said resource identifier is a bit pattern associated with a Uniform Resource Locator (URL) stored within a resource database;

causing an information interface to update a database;

causing a browser to display said InfoBite and perform updates of a display from said database; and if further information is requested, causing said browser to notify said server of said request.

* * * * *